(12) United States Patent
Doshi et al.

(10) Patent No.: US 12,204,400 B2
(45) Date of Patent: Jan. 21, 2025

(54) DYNAMIC TRACING CONTROL

(71) Applicant: Intel Corporation, Santa Clara, CA (US)

(72) Inventors: Kshitij Doshi, Tempe, AZ (US); Ned M. Smith, Beaverton, OR (US); Francesc Guim Bernat, Barcelona (ES); Katalin Bartfai-Walcott, El Dorado Hills, CA (US)

(73) Assignee: Intel Corporation, Santa Clara, CA (US)

(*) Notice: Subject to any disclaimer, the term of this patent is extended or adjusted under 35 U.S.C. 154(b) by 911 days.

(21) Appl. No.: 17/033,105

(22) Filed: Sep. 25, 2020

(65) Prior Publication Data
US 2021/0081271 A1   Mar. 18, 2021

(51) Int. Cl.
| G06F 11/07 | (2006.01) |
| G06F 11/30 | (2006.01) |
| G06F 11/36 | (2006.01) |
| G06F 21/53 | (2013.01) |

(52) U.S. Cl.
CPC ...... *G06F 11/0793* (2013.01); *G06F 11/0772* (2013.01); *G06F 11/3006* (2013.01); *G06F 11/302* (2013.01); *G06F 11/3636* (2013.01); *G06F 21/53* (2013.01)

(58) Field of Classification Search
CPC .............. G06F 11/0772; G06F 11/3006; G06F 11/302; G06F 11/3636; G06F 11/0793
See application file for complete search history.

(56) References Cited

U.S. PATENT DOCUMENTS

| 6,189,141 B1* | 2/2001 | Benitez ............... G06F 11/3636 |
| | | 714/E11.212 |
| 9,535,820 B2* | 1/2017 | Lantz ................... G06F 11/3648 |
| 11,620,393 B1* | 4/2023 | Premaradj ........... G06F 21/6209 |
| | | 713/165 |
| 2007/0124434 A1* | 5/2007 | Smith ..................... H04L 63/10 |
| | | 709/220 |
| 2009/0171526 A1* | 7/2009 | Takenaka ............ B60W 40/101 |
| | | 701/70 |

(Continued)

FOREIGN PATENT DOCUMENTS

WO    2020177854    9/2020

OTHER PUBLICATIONS

Ed et al., "In-band Network Telemetry (INT)," Jun. 2016, 28 pages.

(Continued)

*Primary Examiner* — Kamini B Patel
(74) *Attorney, Agent, or Firm* — Hanley, Flight & Zimmerman, LLC

(57) ABSTRACT

Methods, apparatus, systems, and articles of manufacture to provide a distributed edge-based tracing framework system are disclosed. An example system includes an intermediary generator to generate an intermediary in response to a monitoring request, the intermediary to monitor execution of a service executing in an execution vehicle; an intermediary controller to gather data regarding the monitored execution of the service from the intermediary, and control the intermediary in response to the monitored execution; and a remediator to provide a remediation in response to an error identified in the monitored execution of the service.

21 Claims, 27 Drawing Sheets

(56) References Cited

U.S. PATENT DOCUMENTS

| | | | |
|---|---|---|---|
| 2014/0059205 A1* | 2/2014 | Mohammed | H04L 69/163 709/224 |
| 2016/0014688 A1* | 1/2016 | Gonen | H04L 63/083 709/225 |
| 2016/0269482 A1 | 9/2016 | Jamjoom et al. | |
| 2017/0168917 A1* | 6/2017 | Doi | G06F 11/3636 |
| 2017/0178072 A1* | 6/2017 | Poornachandran | H04L 9/3236 |
| 2018/0083855 A1* | 3/2018 | Weiny | H04L 41/0668 |
| 2018/0191581 A1* | 7/2018 | Yu | H04L 41/042 |
| 2018/0270107 A1 | 9/2018 | Nassar et al. | |
| 2019/0280935 A1* | 9/2019 | Aftab | H04L 41/40 |
| 2020/0169549 A1* | 5/2020 | Smith | H04L 63/101 |
| 2021/0014113 A1* | 1/2021 | Guim Bernat | H04L 41/0273 |
| 2021/0048958 A1* | 2/2021 | Guim Bernat | G06F 3/0604 |
| 2021/0263779 A1* | 8/2021 | Haghighat | G06F 21/78 |
| 2021/0406127 A1* | 12/2021 | Knierim | G06F 9/5072 |
| 2022/0116335 A1* | 4/2022 | Sharma Banjade | H04W 28/16 |
| 2022/0124005 A1* | 4/2022 | Doshi | H04L 47/821 |
| 2022/0222117 A1* | 7/2022 | Kutch | G06F 9/5005 |
| 2023/0156826 A1* | 5/2023 | Palermo | H04W 76/10 370/329 |
| 2023/0224716 A1* | 7/2023 | Zufall | H04L 43/0876 370/328 |
| 2023/0224937 A1* | 7/2023 | Zufall | H04W 76/10 370/329 |

OTHER PUBLICATIONS

European Patent Office, "Extended Search Report," issue in connection with EP Patent application No. 21183535, mailed on Jan. 19, 2022, 12 pages.

Failure Localization in a Distributed Microservie Environment ED—Karl Kuhn, Nov. 15, 2016, 6 pages.

European Patent Office, "Communication Pursuant to Article 94(3) of the EPC," issued in connection with European Patent Application No. 21183535.0, issued on Oct. 4, 2023, 4 pages.

* cited by examiner

DYNAMIC TRACING CONTROL

FIELD OF THE DISCLOSURE

This disclosure relates generally to an edge computing environment, and, more particularly, to dynamic tracing control in an edge computing environment.

BACKGROUND

Debugging and identifying errors in software code, firmware hardware design, etc., is time-consuming, labor-intensive, and difficult. Adding a distributed network infrastructure further complicates the debugging problem. Collecting information and implementing control across multiple systems can be difficult, if not impossible, given the presence of multiple entities and associated rules. In a distributed network, different locations can belong to different trust boundaries, frustrating attempts to monitor and adjust system behavior across the network.

Figure 1A:
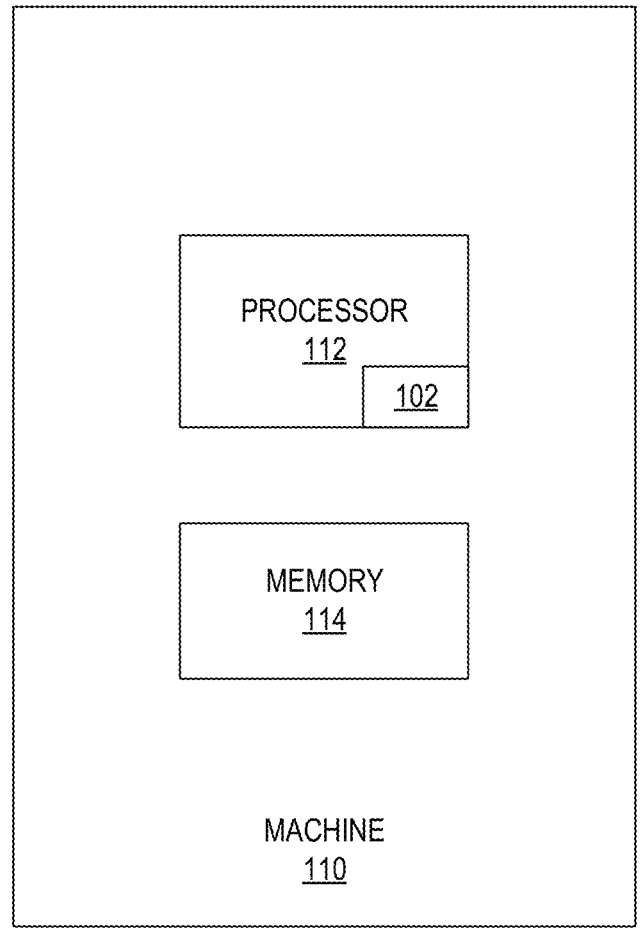
FIGS. 1A-1F are block diagrams showing example infrastructure supporting execution of services in a plurality of configurations.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

DETAILED DESCRIPTION

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

Edge computing use cases in mobile network settings have been developed for integration with Multi-access Edge Computing (MEC) approaches, also known as "mobile edge computing." MEC approaches are designed to allow application developers and content providers to access computing capabilities and an information technology (IT) service environment in dynamic mobile network settings at the edge of the network. Limited standards have been developed by the European Telecommunications Standards Institute (ETSI) industry specification group (ISG) in an attempt to define common interfaces for operation of MEC systems, platforms, hosts, services, and applications.

Edge computing, satellite edge computing (e.g., edge nodes connected to the Internet via satellite), MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations and concerns with orchestration, functional coordination, and resource management, especially in complex mobility settings where many participants (e.g., devices, hosts, tenants, service providers, operators, etc.) are involved.

In a similar manner, Internet of Things (IoT) networks and devices are designed to offer a distributed compute arrangement from a variety of endpoints. IoT devices can be physical or virtualized objects that may communicate on a network, and can include sensors, actuators, and other input/output components, which may be used to collect data or perform actions in a real-world environment. For example, IoT devices can include low-powered endpoint devices that are embedded or attached to everyday things, such as buildings, vehicles, packages, etc., to provide an additional level of artificial sensory perception of those things. IoT devices have become more popular and thus applications using these devices have proliferated.

In some examples, an edge environment can include an enterprise edge in which communication with and/or communication within the enterprise edge can be facilitated via wireless and/or wired connectivity. The deployment of various Edge, Fog, MEC, and IoT networks, devices, and services have introduced a number of advanced use cases and scenarios occurring at and towards the edge of the network. However, these advanced use cases have also introduced a number of corresponding technical challenges relating to security, processing and network resources, service availability and efficiency, among many other issues. One such challenge is in relation to Edge, Fog, MEC, and IoT networks, devices, and services executing workloads on behalf of endpoint devices including establishing provenance to determine data integrity and/or data restrictions.

The present techniques and configurations may be utilized in connection with many aspects of current networking systems, but are provided with reference to Edge Cloud, IoT, MEC, and other distributed computing deployments. The following systems and techniques may be implemented in, or augment, a variety of distributed, virtualized, or managed edge computing systems. These include environments in which network services are implemented or managed using MEC, fourth generation (4G) or fifth generation (5G) wireless network configurations; or in wired network configurations involving fiber, copper, and/or other connections. Further, aspects of processing by the respective computing components may involve computational elements which are in geographical proximity of user equipment or other endpoint locations, such as a smartphone, vehicular communication component, IoT device, etc. Further, the presently disclosed techniques may relate to other Edge/MEC/IoT network communication standards and configurations, and other intermediate processing entities and architectures.

Edge computing is a developing paradigm where computing is performed at or closer to the "edge" of a network, typically through the use of a computing platform implemented at base stations, gateways, network routers, or other devices which are much closer to end point devices producing and consuming the data. For example, edge gateway servers may be equipped with pools of memory and storage resources to perform computations in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with computing hardware that performs virtualized network functions and offers compute resources for the execution of services and consumer functions for connected devices.

Edge environments include networks and/or portions of networks that are located between a cloud environment and an endpoint environment. Edge environments enable computations of workloads at edges of a network. For example, an endpoint device (e.g., a user device) may request a nearby base station to compute a workload rather than a central server in a cloud environment. Edge environments include edge services (e.g., an edge platform for hire (EPH)), which include pools of memory, storage resources, and processing resources. In some examples, edge environments may include an edge as a service (EaaS), which may include one or more edge services. Edge services perform computations, such as an execution of a workload, on behalf of other edge services, edge nodes (e.g., EPH nodes), endpoint devices, etc. Edge environments facilitate connections between producers (e.g., workload executors, edge services) and consumers (e.g., other edge services, endpoint devices).

Because edge services may be closer in proximity to endpoint devices than centralized servers in cloud environments, edge services enable computations of workloads with a lower latency (e.g., response time) than cloud environments. Edge services may also enable a localized execution of a workload based on geographic locations or network topographies. For example, an endpoint device may require a workload to be executed in a first geographic area, but a centralized server may be located in a second geographic area. The endpoint device can request a workload execution by an edge service located in the first geographic area to comply with corporate or regulatory restrictions.

Examples of workloads to be executed in an edge environment (e.g., via an EaaS, via an edge service, on an EPH node, etc.) include autonomous driving computations, video surveillance monitoring, machine learning model executions, and real time data analytics. Additional examples of workloads include delivering and/or encoding media streams, measuring advertisement impression rates, object detection in media streams, speech analytics, asset and/or inventory management, and augmented reality processing.

In some examples, edge services enable both the execution of workloads and a return of a result of an executed workload to endpoint devices with a response time lower than the response time of a server in a cloud environment. For example, if an edge service is located closer to an endpoint device on a network than a cloud server, the edge service may respond to workload execution requests from the endpoint device faster than the cloud server. An endpoint device may request an execution of a time-constrained workload from an edge service rather than a cloud server.

In addition, edge services enable the distribution and decentralization of workload executions. For example, an endpoint device may request a first workload execution and a second workload execution. In some examples, a cloud server may respond to both workload execution requests. With an edge environment, however, a first edge service may execute the first workload execution request, and a second edge service may execute the second workload execution request.

Additional infrastructure may be included in an edge environment to facilitate the execution of workloads on behalf of endpoint devices. For example, an orchestrator may access a request to execute a workload from an endpoint device and provide offers to a plurality of edge nodes. The offers may include a description of the workload to be executed and terms regarding energy and resource constraints. An edge node (e.g., an EPH node) may accept the offer, execute the workload, and provide a result of the execution to infrastructure in the edge environment and/or to the endpoint device.

Delivery of services in an Edge as a Service (EaaS) ecosystem (e.g., in an edge environment, via an EPH, via an edge infrastructure element, etc.) may include a business model where subscribers to the EaaS service (e.g., endpoint devices, user devices, etc.) pay for access to edge services. In some examples, the endpoint devices may pay for edge services (such as an execution of a workload) via micropayments, credits, tokens, e-currencies, etc. In some examples, revenue models may include mobile network operators (MNOs) that maintain subscriptions from a subscriber base (such as one or more networks) as a way to pay for edge services by entering into service-level agreement (SLA) contracts. An SLA can include one or more service level objectives (SLOs), for example. An SLO can include a metric such as uptime, response time, etc. Accounting executed and/or managed by the MNO may determine billable services that are then applied to subscriber accounts.

The rapid growth of edge computing presents a challenge and an opportunity for software engineering practices at scale. For example, debugging, A/B testing, correlating anomalies, ruling out factors as causes of bugs and/or failures, establishing patterns among faults and failures, etc., are complicated operations across large numbers of independently developed microservices that work in concert to deliver end-user value. Further, these problems are complicated further at the edge of the network, where the computing infrastructure is heterogeneous, different systems are maintained in different locations and subject to different failure profiles, timing anomalies are more likely due to non-uniform communication and non-localized placements, and other obfuscating factors, such as power-constrained and bandwidth-constrained distribution of tasks, exist. Adding to these complications is the problem that different edge locations can belong to different trust boundaries. As such, a chain of actions that spans different microservices in loosely-coupled interactions can also be transparent, semi-transparent, or opaque when attempting to correlate data and statistics to trace execution of software/program code, collect debugging information for execution of the software code, etc.

As used herein, the terms "microservice, "service", "task", "operation", and "function" can be used interchangeably to indicate an application, a process, and/or other software code (also referred to as program code) for execution using computing infrastructure, such as the edge computing environment. Software code, script, and/or other service can be contained for execution in a sandbox or other execution vehicle, which insulates one process from another process and its environment through software fault-isolation, language-level isolation mechanisms, etc.

In development or testing of software and/or other service, tracing provides information regarding the software program's execution. Tracing can be used to log events occurring in code execution, branching during code execution, data being saved and/or accessed, etc. By following a trace, a problem in code execution can be identified and remedied to perfect/correct the service, for example. However, tracing full program execution can be expensive.

Examples disclosed herein provide distributed event logging for software code evaluation and improvement. In certain examples, events are associated with markers and presented as a trace for debugging, quality control, auditing, etc. Examples disclosed herein provide tracing proxies, verification proxies, and trace- and verification-control intermediaries that provide an infrastructure to monitor events of interest and automate verification, while reducing or minimizing intrusion on performance and software development practices. As such, overhead can be kept small on production software. Additionally, debugging, tracing, and/or logging of code to identify and focus on a problem arising during and/or after production deployments can be reduced or minimized through use of dynamic, distributed tracing control.

Virtual machine or containers can be instantiated on the edge computing network. In certain examples, the edge computing network or infrastructure can include and/or be organized according to one or more meshes, which distribute data and computing among nodes in the mesh. However, dynamic tracing control is not linked to containers or other virtual memory constructs but is instead correlated to end-to-end connections in a service mesh. Tracing, event logging, resource monitoring, etc., can be facilitated via a tracing framework, which collects information across a system (e.g., across an edge computing infrastructure, etc.).

Examples disclosed herein provide dynamic tracing control as a flexible, entity-independent infrastructure for monitoring events of interest and improving application and/or service development and execution. The infrastructure reduces an amount of overhead devoted to production software development and reduces an amount of debugging, tracing, and/or logging code used to identify and focus on a problem that may arise during or after production deployment of application, process, or other service. The infrastructure also reduces complexity of transparently shifting and automating actions including monitoring, logging, filtering, testing, and verification to logic such as a smart network interface card (NIC), smart storage logic, acceleration logic, etc., wherein such devices can be available in a data center and/or edge cloud infrastructure, for example.

FIGS. 1A-1F are block diagrams showing example infrastructure supporting execution of services in a plurality of configurations. As shown in the example of FIG. 1A, a service 102 can run directly on a hardware machine 110. As such, the service 102 can directly leverage hardware, software, and/or firmware resources of the physical machine 110 including a processor 112 and memory 114.

Figure 1B:
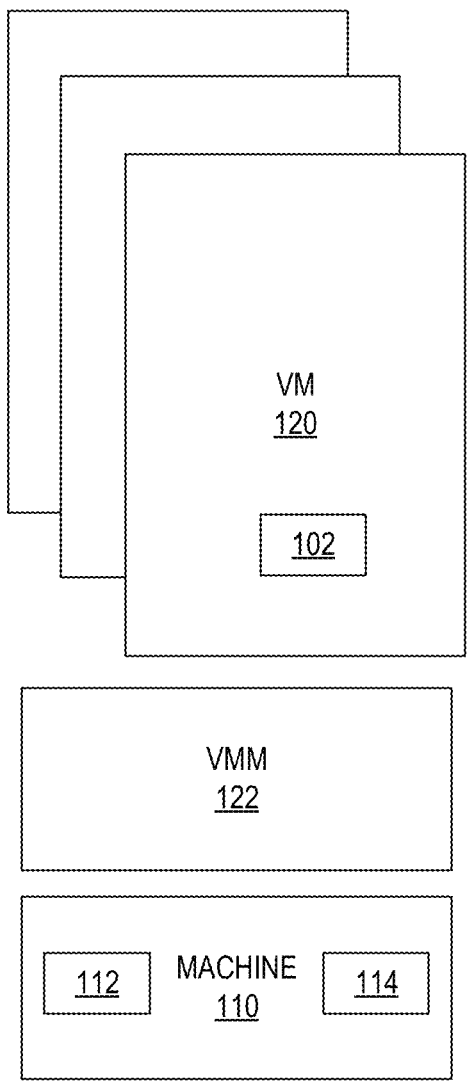

Alternatively or additionally, as shown in the example of FIG. 1B, the service 102 can execute in a hardware-based virtual machine 120 (VM). For example, the service 102 can execute in one or more VMs 120 controlled by a virtual machine manager (VMM) 122 (e.g., a hypervisor, etc.) leveraging underlying machine hardware 110. This configuration provides hardware-level virtualization to interact with hardware of the machine 110 including the processor 112 and memory 114.

Figure 1C:
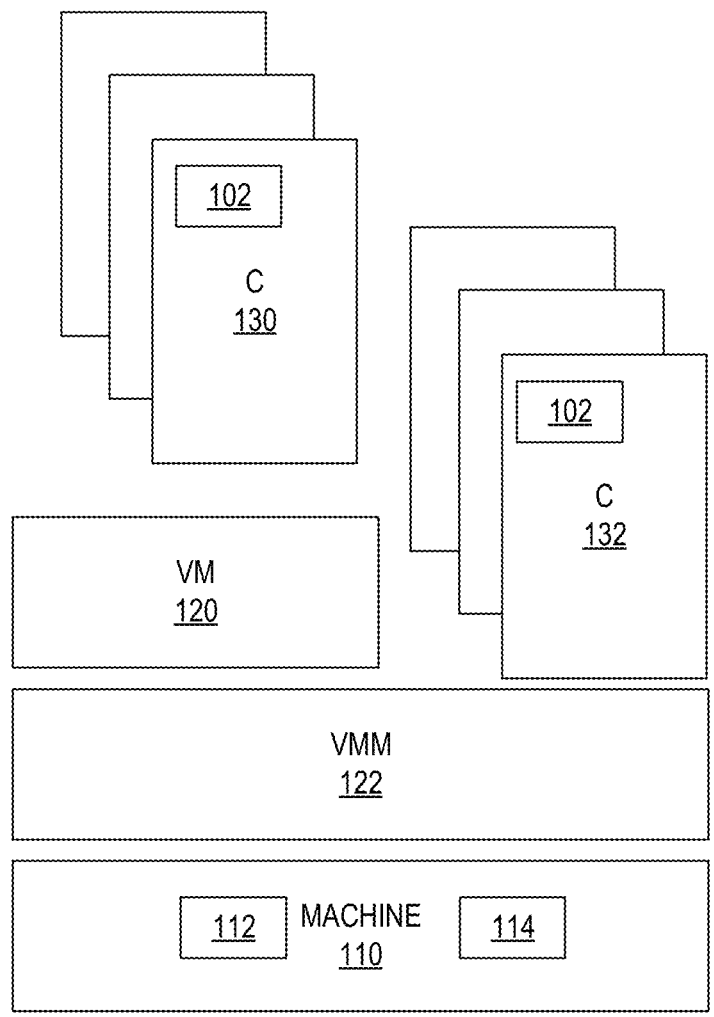

As shown in the example of FIG. 1C, the service 102 can execute in one or more containers 130-132 or in a container in a pod. The container(s) 130 can execute in a VM 120 and/or the container(s) 132 can execute directly in an address space of the VMM 122 on the machine 110.

Figure 1D:
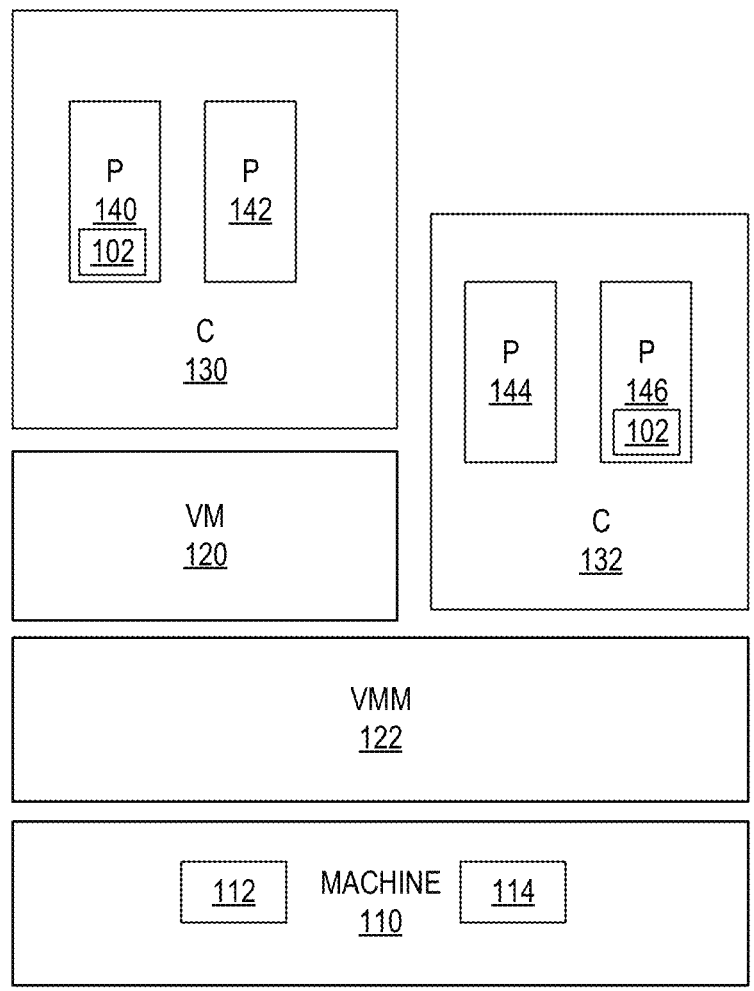

In the example of FIG. 1D, the service 102 can execute inside a process 140-146 within a container group 130-132. As in the example of FIG. 1C, one or more containers 130-132 execute on the VM 120 and/or in an address space of the VMM 122 on the machine 110. The process(es) 140-146 representing the service 102 execute within one or more containers 130-132 in the VM 120 and/or the VMM 122, for example.

Figure 1E:
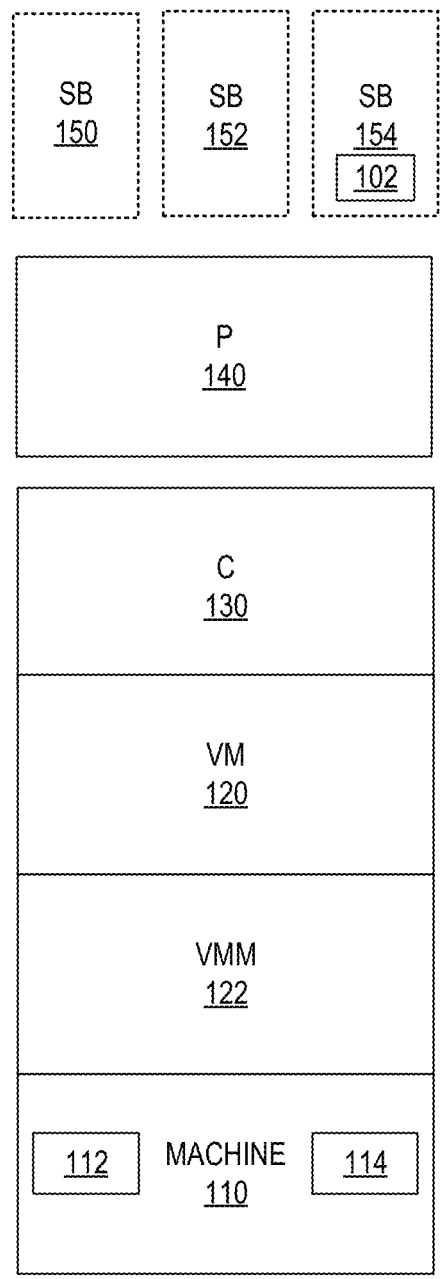

In the example of FIG. 1E, the service 102 can execute in one or more sub-process sandboxes (SB) 150-154 which are insulated from one another through software fault-isolation and/or through language level isolation mechanisms, for example. In certain examples, one or more of the sub-process SBs 150-154 can be hardware mechanism-based SBs created using protection keys and/or operating system mechanisms that partition an address space and assign different segments to different services. In other examples, security-related instruction codes, such as Intel SGX (software guard extensions), etc., can be used to execute the service 102 with a lightweight "library" operating system (OS) to implement the sub-process sandboxing 150-154.

Figure 1F:
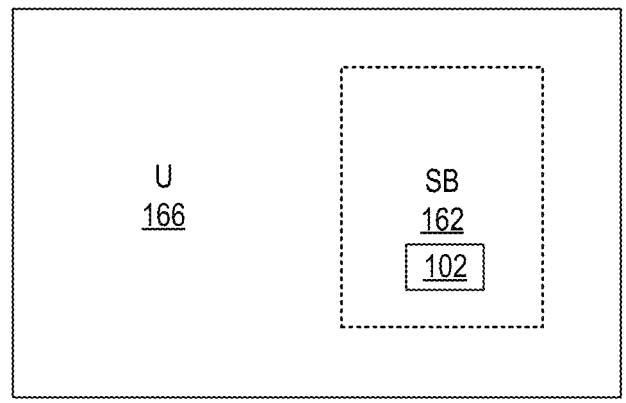
Figure 1F:
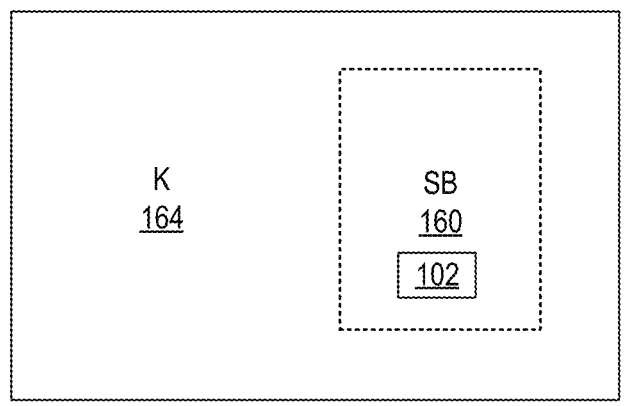

FIG. 1F illustrates example sandboxes (SBs) 160-162 instantiated to execute the service 102 in a ring 0 or kernel address space (e.g., ring 0) 164 and/or in a user space (e.g., ring 3) 166. In such examples, protection rings and/or other hierarchical protection domain can be used to isolate the service 102 from other data in memory 114 or processor 112 functionality.

As illustrated in the examples of FIGS. 1A-1F, the service 102 and/or other application, process, software program code, etc., can execute in a sandbox (SB) and/or other execution vehicle (EV) (e.g., a container, a VM, a process, a processor, etc.) to contain the service 102 and isolate it from other system functionality. Containment structures, such as an SB, other EV, etc., provide a boundary that can be crossed to enable interaction with another service in a different SB or other EV, for example. Interaction between EVs can occur via wired and/or wireless-based communication in a terrestrial and/or satellite-based environment, for example.

In certain examples, two services in two separate SBs can have a shared memory area that is accessible to each service (e.g., for lightweight communication and coordination, etc.). In these examples, accesses to memory areas shared among sandboxes can occur through interceptable primitives (e.g., set, get, etc.), which allow for relocatability of services.

In certain examples, tracing, monitoring, debugging, etc., of an individual service in isolation are performed by attaching a utility such as a debugger and/or by performing a process-control action such as "strace," "ltrace," etc., on a process identifier (PID) inside an SB or other EV. However, debugging and/or tracing a service (e.g., a macro-service, etc.) including an interacting group of smaller or microservices, interaction across EVs, and potentially across platforms, owners, etc., involves new technologies and methodologies beyond requires beyond a debug utility or process-control action. Such new tools are to be distributable and/or federatable across different SBs/EVs in which different services are executed, for example.

Figure 2A:
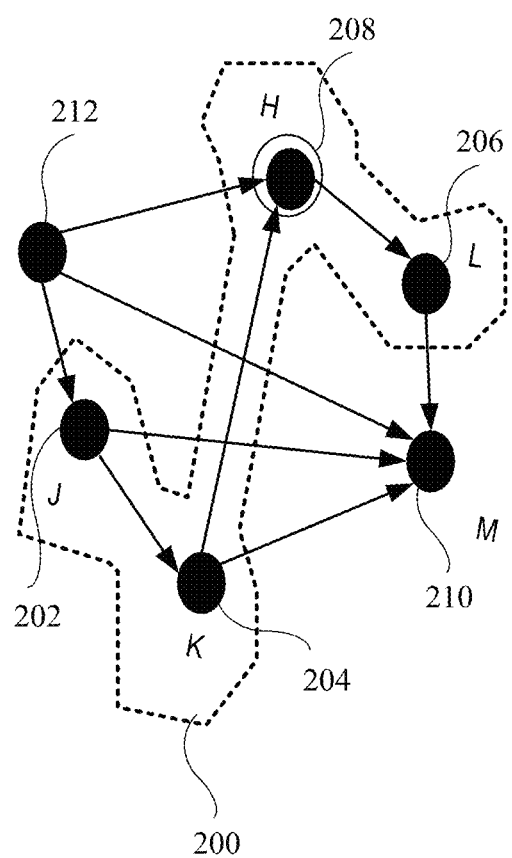
FIG. 2A illustrates a portion of an example multi-microservices execution graph.

FIG. 2A illustrates a portion of an example multi-microservices execution graph 200. The example graph 200 includes three nodes of interest J 202, K 204, and L 206, as well as an intermediate node H 208. Each node 202-208 represents a service executing in an associated SB or other EV in a network infrastructure, such as an edge computing environment. In the example of FIG. 2A, a monitor M 210 monitors interaction among the nodes J 202, K 204, and L 206 of the graph 200. A trace node I 212 collects traces of interactions among the nodes J 202, K 204, and L 206 in the graph.

In the illustrated example of FIG. 2A, even though the intermediate node H 208 is part of the execution graph 200, the node H 208 itself may not be interesting for one or more operational reasons. For example, the node H 208 may be a trivial microservice that is not interesting. Noe H 208 may be uninstrumentable (e.g., H 208 may be implemented inside a hardware accelerator, etc.). Node H 208 may be prohibitively costly to trace (e.g., node H 208 may be adding two terabyte sized vectors to produce a third terabyte sized vector, etc.). As such, it may be desirable to monitor or trace services J 202, K 204, and L 206 without monitoring or tracing node H 208.

Figure 2B:
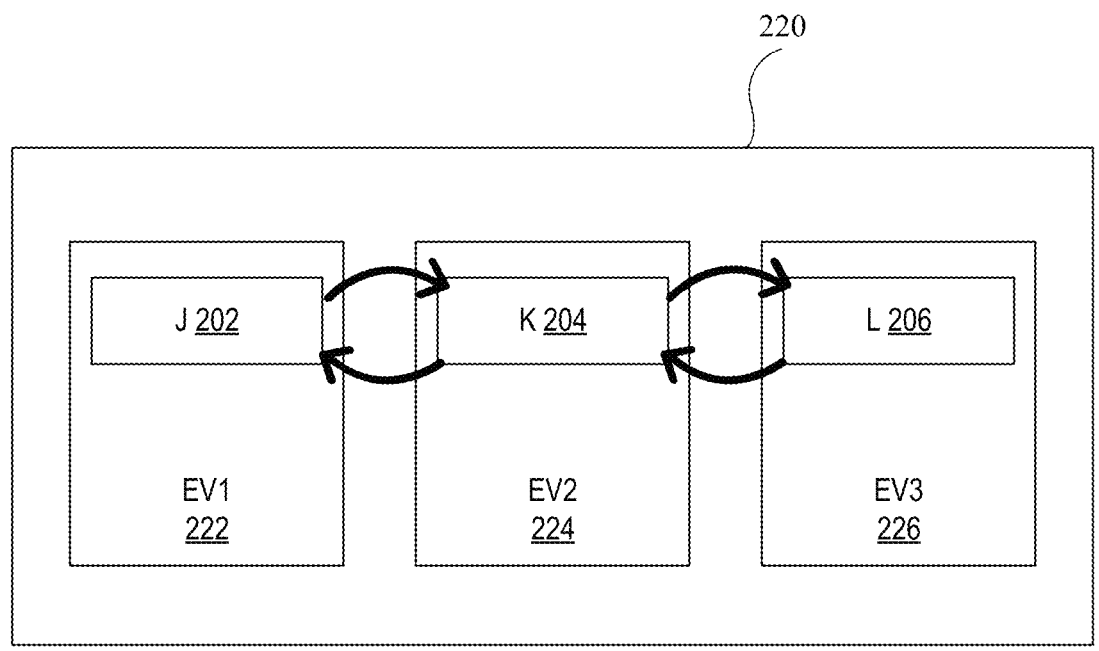
FIG. 2B shows an example edge computing infrastructure in which services can be executed and evaluated.

As shown in the example of FIG. 2B, in an example edge computing infrastructure 220, the service associated with node J 202 runs on an EV1 222, the service associated with node K 204 runs on an EV2 224, and the service associated with node L 206 runs on an EV3 226. The three sandboxes or execution vehicles 222-226 can communicate, which may or may not go through a physical network stack. The EV1 222, EV2 224, and EV3 226 can be different execution vehicles with independent address spaces and software stacks within them, for example. The EV 222-226 can also belong to different security principals, for example. Interactions (e.g., between K 204 and L 206, between J 202 and L 206, etc.) can occur through intermediaries (e.g., node H 208) that are not instrumented for tracing, debugging, etc. Certain examples enable tracing, debugging, and/or other analysis to drive reasoning regarding causes, effects, statistical correlations, etc., with services 202-206 in the network 200.

Figure 3:
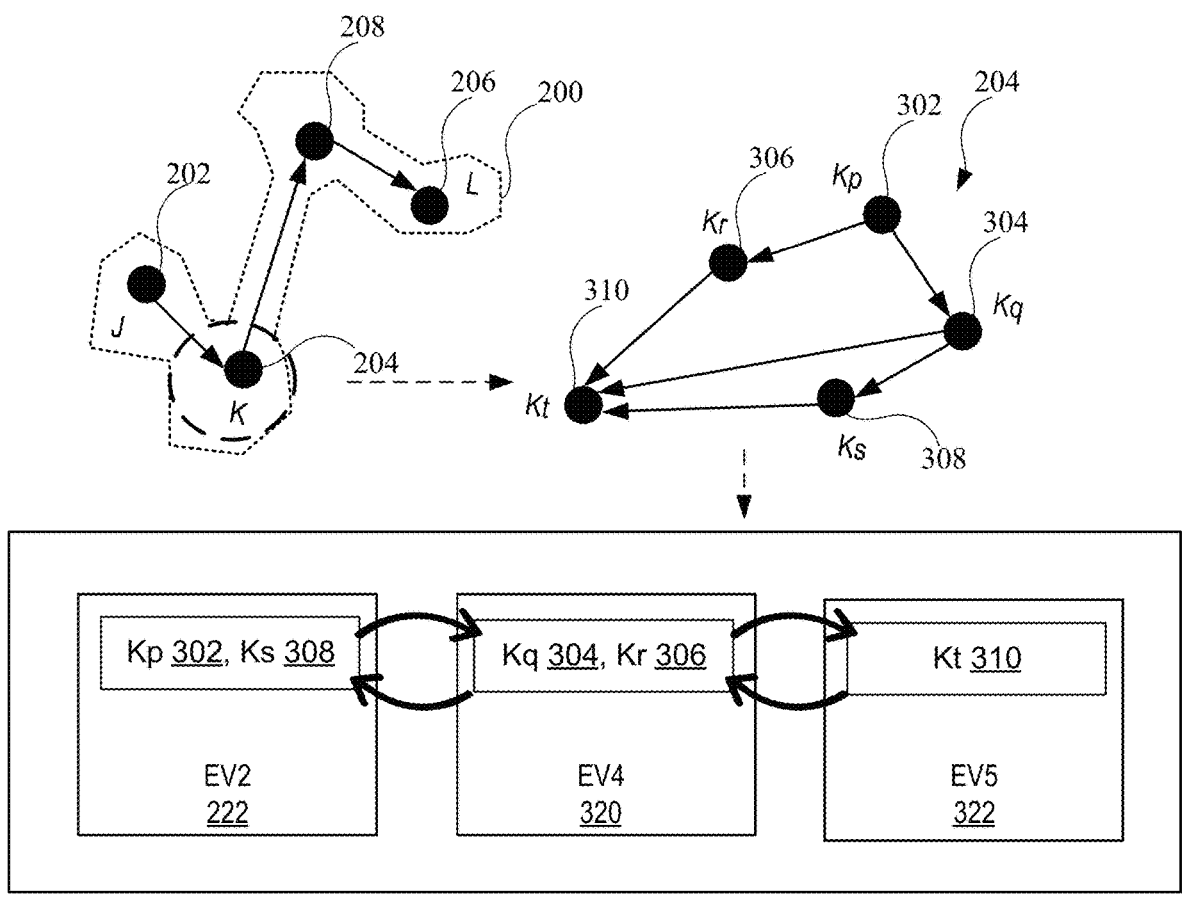
FIG. 3 shows an example edge computing infrastructure in which services can be executed and evaluated.

As shown in the example of FIG. 3, the node K 204 (e.g., the service K 204) can include a plurality of other services Kp 302, Kq 304, Kr 306, Ks 308, and Kt 310, which execute in sandboxes EV2 224, EV4 320, and EV5 322 in the edge computing infrastructure 220, where Kp 302 and Ks 308 execute within the same sandbox EV2 224, Kq 304 and Kr 306 execute in the sandbox EV4 320, and Kt 310 executes in the sandbox EV5 322.

In certain examples, the service (e.g., macro-service) of node K 204 can be analyzed to trace interactions among the micro-services Kp 302, Kq 304, . . . Kt 310 forming the service K 204. In other examples, the service K 204 can be monitored for high-level indications of the health of K 204 as a whole, and lower-level tracing within the sub-graph under node K 204 can be activated on an ad-hoc (dynamic) basis. Graph- and subgraph-level control is enabled and programmatically achievable using dynamic tracing within and across an edge and/or other computing platform infrastructure. The sandboxes EV2 222, EV4 320, and EV5 322 can involve different security provisions to monitor and/or trace their hardware or platform infrastructure. Such different security provisions may not be available to an owner, developer, or tester of a collection of services. Certain examples enable cross-platform monitoring, tracing, and/or testing of services in view of varying hardware and/or software structure, security provisions, access control, etc.

Figure 4:
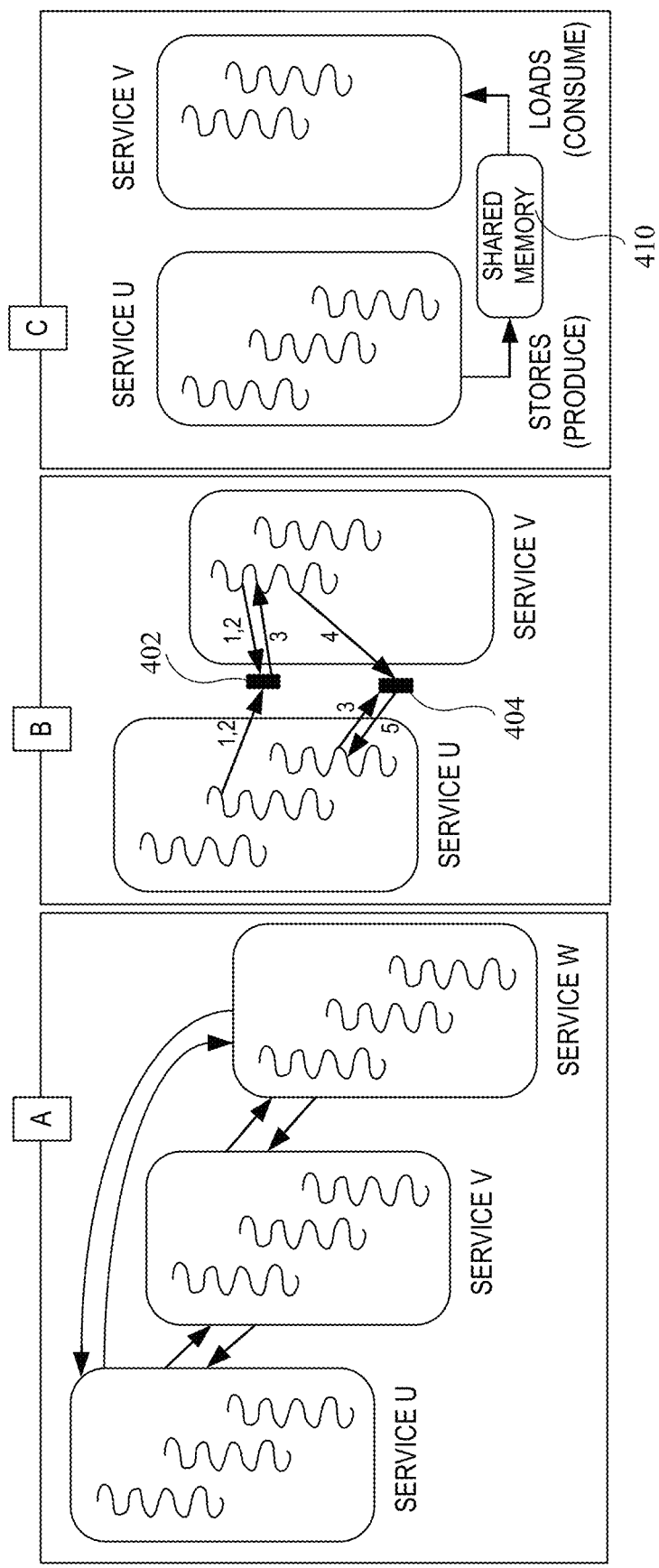
FIG. 4 illustrates three example interactions among services that can be traced as disclosed and described herein.

FIG. 4 illustrates three example interactions among services that can be traced as disclosed and described herein. Example A shows a service U, a service V, and a service W. Each service U, V, W in example A represents an invocation through remote procedure calls (RPCs), which can be optimized RPCs (gRPCs), for example.

Example B shows an interaction between service U and service V based on event signaling. For example, at 1, service U signals an event 402 for which, at 2, service V is waiting (or vice versa). At 3, signaling of the event 402 causes service V to perform a responsive action. At 4, service V signals another event 404 for which service U may be waiting. At 5, service U proceeds after the event 404 is signaled. Example B shows an example pattern of asynchronous communication with event-based synchronization.

Example C shows another example interaction pattern in which a shared memory based data structure 410 is used to receive data and/or events produced by one service, and the produced data is retrieved by a peer service at a later time. The shared memory 410 need not be local; the shared memory can be distributed. Communication primitives for the shared memory 410 can employ a memory access protocol such as remote direct memory access (RDMA), virtual RDMA (e.g., an emulation of RDMA on top of user datagram protocol (UDP), etc.). As shown in the example of FIG. 4, the service U stores data and/or an event in the shared memory 410 (e.g., the service U produces data/event), and the service V loads data and/or an event from the shared memory 410 (e.g., the service V consumes data/event).

Figure 5A:
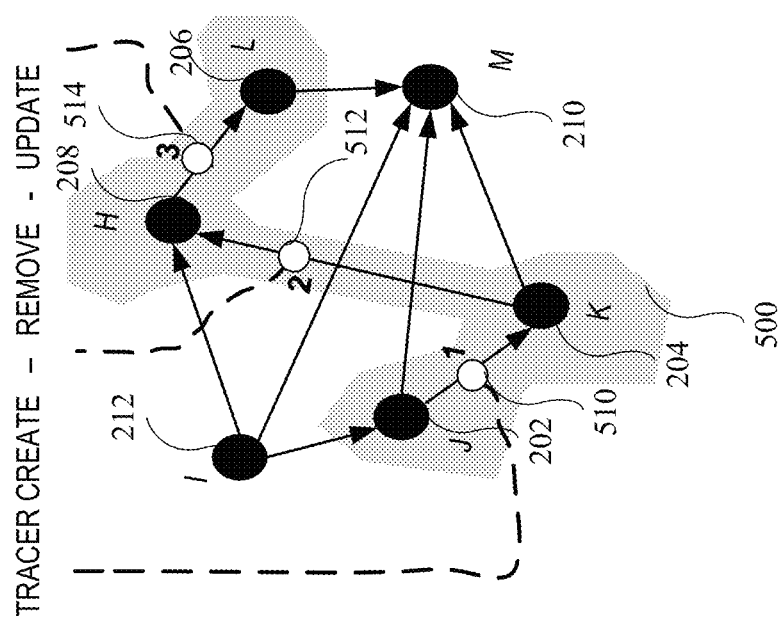
FIG. 5A illustrates an example computation graph into which tracer points have been added.
Figure 5B:
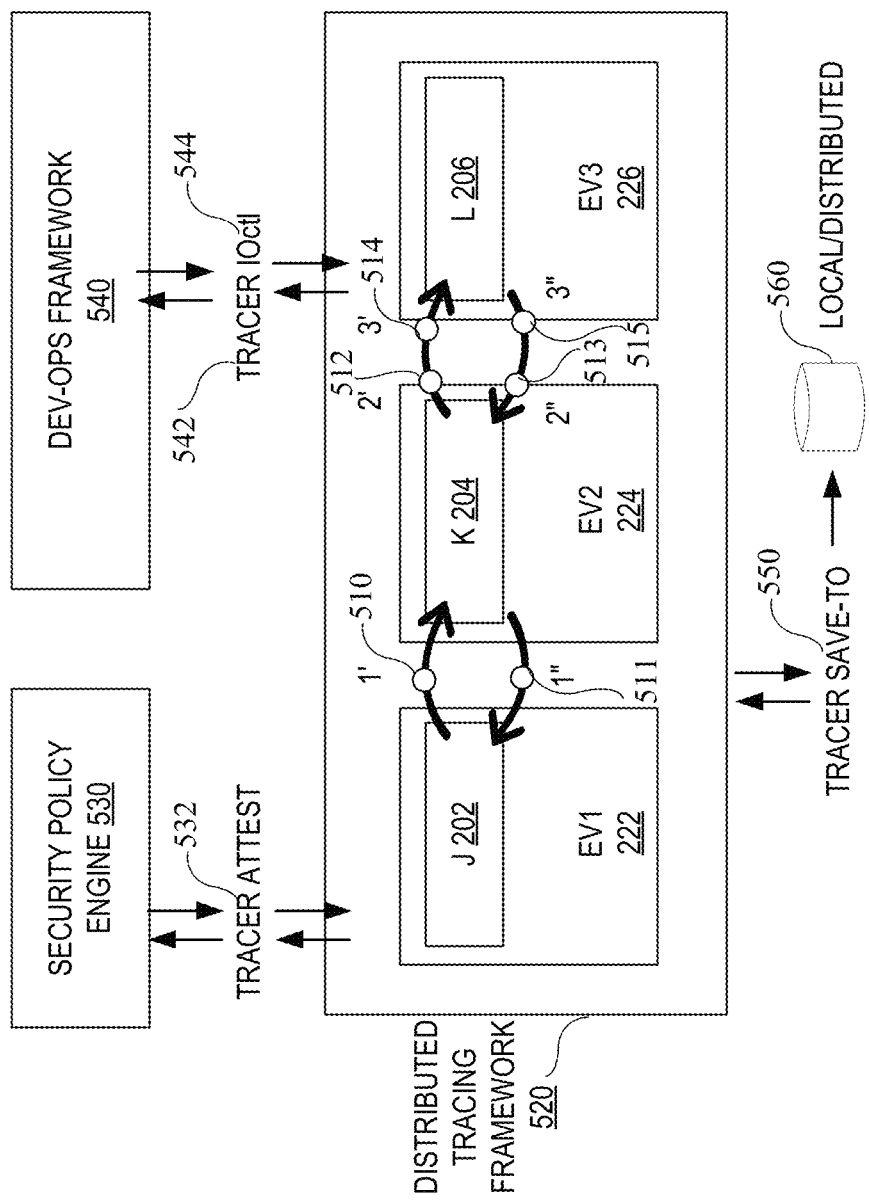
FIG. 5B is a block diagram of an example distributed tracing framework.

FIGS. 5A-5B illustrate systems and associated processes for tracing and monitoring of service execution in a network infrastructure such as an edge computing infrastructure. FIGS. 5A-5B illustrate interfaces for programmatic insertion, removal, and control of tracers (also referred to as taps or tap points). FIG. 5A illustrates actions to create and remove tracers, and an action to update a tracer, such as modulating a type and information to be collected by the tracer and/or optional actions the tracer can perform upon the tracer point being reached in service/process code execution. Additional/optional actions can include transforming collected information, filtering collected information to reduce detail, potentially encrypt the collected information, compress the collected information, etc.

FIG. 5A illustrates an example computation graph 500 into which tracer points or taps (test access points) 510-514 have been added. Taps 510-514 can be implemented using software (e.g., a monitoring/tracing service and/or other process), hardware (e.g., a wire, sensor, in-line sniffer, and/or other monitoring port, etc.), and/or firmware (e.g., a customized programmable monitor, etc.), for example. The example graph includes nodes J 202, K 204, L 206, H 208, M 210, and I 212 along with the taps 510-514. The example taps 510-514 enable tracer creation, removal, and updated in the example network graph 500.

In the illustrated example of FIG. 5A, tap 1 510 monitors interaction between service J 202 and service K 2024. For example, the tap 510 captures "outflows" of data such as gRPC, event, and/or set action from node J 202, as well as corresponding gRPC/event/get "inflows" into node K 204. The tap 2 512 monitors interaction between service K 204 and service H 208. In certain examples, the tap 512 recognizes that node K 204 is uninteresting or inscrutable and configures itself for one-sided tracing of outflows from node K 204 to node H 208. Similarly, the tap 3 514 can similarly be configured for one-sided tracing of inflows into the service node L 206.

In certain examples, such as shown in FIG. 5A, a tap or tracer point (such as tap 1 510, tap 2 512, and tap 3 514 in the example of FIG. 5A, etc.) is an insertion point in a process flow or a hook where a number of actions can be performed as directed by a program when a control flow (e.g., a program counter, etc.) reaches that tap point 510-514. For a gRPC-based interaction (see, e.g., Example A of FIG. 4), such actions can occur directly in the gRPC path (e.g., as part of a service invocation and return from the invoked callee, etc.). For an event-based interaction (see, e.g., Example B of FIG. 4, etc.), such actions can be performed at event-wait and event-signal calls by intercepting or wrapping such calls. Both interactions (e.g., Examples A and B of FIG. 4, etc.) can be performed in a general way through interposition (e.g., LD_LIBRARY_PATH based interposition, etc.) in which a linker or a loader overrides a primitive with an instrumenting wrapper and then calls the overridden primitive. For interactions based on direct updates in shared memory (see, e.g., Example C of FIG. 4, etc.), software can be guided to use interceptable primitives (e.g., set_ and get_) and/or use write( ) and read( ) primitives for a shared-memory file system, etc. Alternatively or additionally, hardware instruction set architecture (ISA) extensions can enable interception through a single thread to perform a user-level monitor wait (UMWAIT) over a memory range rather than a single address, for example.

FIG. 5B illustrates a distributed tracing framework 520 including a plurality of tap points 510-514 viewed in conjunction with SB/EV constructs 222-226 to execute services J 202, K 204, and L 206, for example. Tap points 1 510, 2 512, and 3 514 are represented in pairs (1', 1") 510-511, (2', 2") 512-513, and (3', 3") 514-515 respectively. The taps 510-514 are represented in pairs 510-515 to indicate that a tap point 510-514 can be bi-directional (e.g., call-return, wait-signal, set-get, etc.). However, in some cases, a tap point 510-514 can be a single-directional interaction.

As illustrated in the example of FIG. 5B, the framework 520 for insertion and activation of tracers 510-515 calls a security policy engine 530 and/or can be called by the security policy engine 530. Accordingly, insertion, removal, and/or update of a tracer's configuration can follow secure attestation 532 of an actual principal or an effective principal via which (e.g., through delegation, etc.) the actual principal can perform various tracer actions.

As shown in the example of FIG. 5B, a DevOps framework 540 provides a second group of interfaces, referred to as "DevOps interfaces", that can programmatically control a flow of monitored data to different software development and operations (DevOps) receivers. DevOps receivers can be used for dynamic analysis, visualization, extraction of statistics, other control actions, etc. The DevOps receivers (e.g., provided as scripts by the DevOps framework 540) provide control over tracer actions and can be discoverable and exercisable by the DevOps framework 540 (e.g., as an extensible interface). As such, the example of FIG. 5B shows a flow of tracer information 542 to the example DevOps framework 540 and input/output control (IOCTL) information 544 provided by the example framework 540 to the distributed tracing framework 520. The IOCTL information forms an IOCTL interface 544 (e.g., a driver control interface for a device or pseudo-device in an operating system, etc.).

The example infrastructure of FIG. 5 also includes an example tracer save interface 550 to direct the flow of traced/monitored information to a storage subsystem 560 (e.g., including local and/or remote volatile memory, local and/or remote non-volatile memory, local and/or remote block-storage, thin provisioned file system, etc.). The data stored through the tracer save interface 550 can also include markers that identify source(s) of traces captured at trace points (e.g., tap(s) 510-515, etc.), etc. Markers can also provide attestation and privileges that apply to the data produced at the trace/tap points 510-515 so that information filtering and transformations can be performed in conjunction with retrieval of information from trace stores, for example. Markers can also provide debugging and/or tracing data collected and marked (e.g., annotated) to be stored securely with automatic lifecycle management such that the data is summarized and then removed or moved into remote and/or other archive storage after being retained on-line for a specified period of time as determined by the DevOps framework 540.

In certain examples, metadata is stored with traces in the data store 560. For example, the metadata includes high resolution timestamps, and an association indication of whether or not the timestamps are local or global timestamps, etc. The metadata also includes certain identifier(s) that can be available directly (e.g., explicitly) at the time of trace collection, such as a process identifier (ID), a thread ID, a sandbox ID, etc., and/or identifier(s) available indirectly according to a specified method of extraction. An example of an indirect identifier is an end-to-end flow of operations across different services in the context of providing value to a given end user or service, such as a user ID and a request ID associated with streaming video to a particular end user. In certain examples, collected metadata can be reported and/or stored in an Inband Network Telemetry (INT) format for compatibility with INT processing software and/or hardware logic.

Figure 6A:
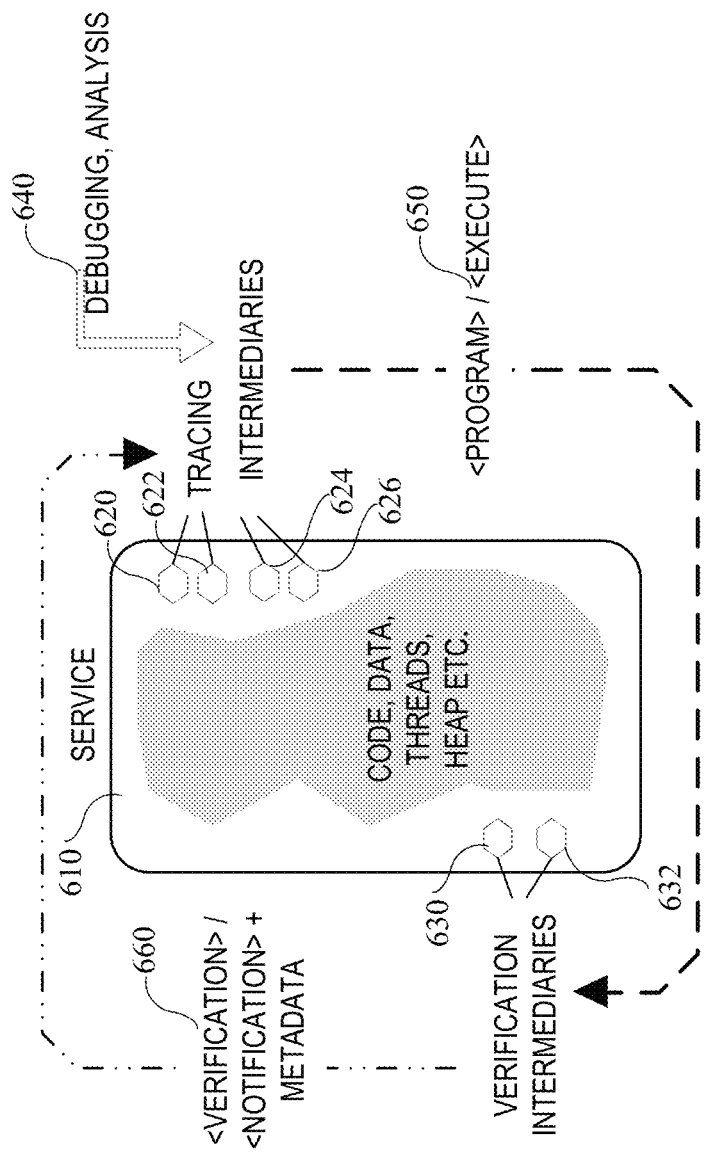
FIGS. 6A-6B illustrate example monitoring of a service using intermediaries.
Figure 6B:
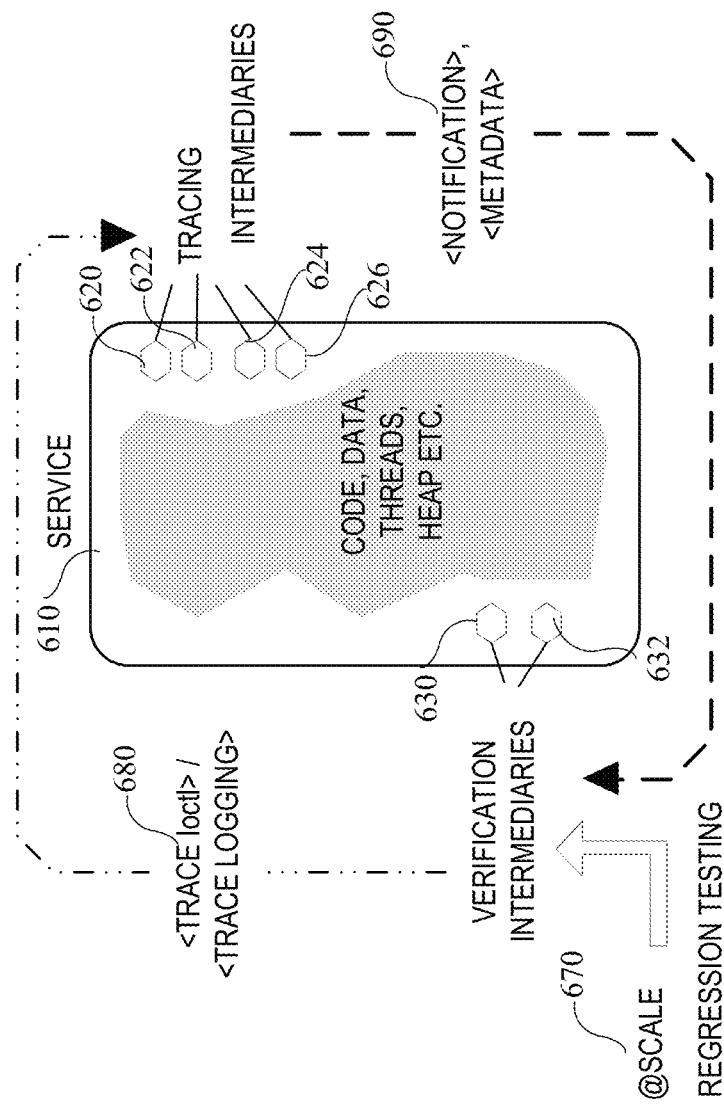

FIGS. 6A-6B illustrate example monitoring of a service using intermediaries to provide in-line, low-overhead verification flows and interactive debugging, tracing, and monitoring. FIG. 6A shows an example service 610 including an executable code region, a data region, execution thread(s), a memory heap allocation area, etc. The example service 610 is associated with two sets of computational intermediaries: tracing intermediaries 620-626 and verification intermediaries 630-632. An intermediary 620-632 is a software, firmware, and/or hardware construct that acts as a proxy to trace service execution/operation such as using tap/trace points 510-515 described above with respect to FIGS. 5A-5B. For example, the intermediary 620-632 can be implemented as a library that is linked with an application to perform tracing actions with respect to the service 610 (e.g., using taps 510-515, etc.).

Rather than inserting a breakpoint or watchpoint, which allows code to run until a defined point and then perform a series of checking actions, the tracing intermediary 620-626 is positioned to monitor code execution 640 of the service 610. The tracing intermediary 620-626 is triggered in a debugging or analysis mode or state 640 by program execution 650 of the service 610 to contact a respective verification intermediary 630-632 that has been pre-programmed or programmed (e.g., just in time, etc.) with a lambda function to run a verification of the program. The verification can be statistical (e.g., checking that randomly selected item(s) in a data structure associated with the service 610 have not been corrupted, etc.) and/or other static and/or dynamic verification (e.g., verifying code conventions, checking acceptance of code with respect to a criterion, anti-pattern detection, metrics calculation, performance/stress test, etc.), etc. In certain examples, each tracing intermediary 620-626 is configured to watch for and/or otherwise be triggered by a different variable, condition, action, etc., in program execution 650 of the service 610.

The tracing intermediary 620-626 directs the verification intermediary 630-632 with activation of a program and/or other script to verify the integrity, appropriateness, correctness, etc., of the execution of the service 610. The verification intermediary 630-632 conducts its verification 650 of service program execution 650. The verification intermediary 630-632 informs the respective tracing intermediary 620-626 of the verification result (e.g., pass/fail, proper/improper, compliant/noncompliant, timing, etc.). The verification intermediary 630-632 can also provide the tracing intermediary 620-626 with metadata (e.g., attestation, high resolution timestamp, etc.) associated with the verification.

FIG. 6B shows another example of the service 610 including an executable code region, a data region, execution thread(s), a memory heap allocation area, etc. In the example of FIG. 6B, tracing intermediaries 620-626 and verification intermediaries 630-632 have been inserted with respect to the example service 610 to provide quality assessment during large scale regression testing 670. In the illustrated example of FIG. 6B, verification intermediaries 630-632 are activated for the regression testing 670. The verification intermediaries 630-632 contact tracing intermediaries 620-626 to perform tracing 680 of the service 610. One or more of the tracing intermediaries 620-626 generate notification(s) 690 when the respective tracing intermediary 620-626 is triggered (e.g., when an associated tracepoint is triggered, etc.). In response to the notification 690, the respective verification intermediary 630-632 applies one or more verification actions to the trace 680 of the service 610 and resumes testing of service 610 execution. Such @scale regression testing may also generate statistical views of program execution for code coverage testing—which paths are most active, how much do path statistics veer from a previous version of the service, etc.

Thus, certain examples provide an infrastructure to support tracing and verification of software applications/processes implemented as services and/or other program code execution. Rather than a centralized console requiring control of the service 610 and human intervention, certain examples provide a network or system of intermediaries 620-632 to monitor and collect traces and other information (e.g., metadata) regarding service and/or other process 610 execution in an edge computing environment of a cloud infrastructure. A tracer tree-based distributed framework 520 is provided to distribute tracer and verification intermediaries 620-632 and to collect traces for resulting analysis. In certain examples, a plurality of trace points and associated intermediaries are used to automatically adjust a level of resolution to identify an issue, problem, error, etc. In certain examples, trace points and associated intermediaries can be established dynamically to identify an error, failure, delay, uncertainty, and/or other issue with the service 610 being monitored. Remediation of the monitored service 610 can be facilitated using the distributed framework 520 leveraging hardware, software, and/or firmware of the edge computing environment of the cloud infrastructure.

In certain examples, memory capacity available to the service 610 can be adjusted on demand to increase or decrease memory available for execution, monitoring, and remediation of the service 610 in a dynamic tracing control framework. For example, non-volatile memory can be requested so that the monitoring and/or remediation actions can use the non-volatile memory to substitute block storage for speedy logging and data retrieval for remediation, etc. Remediation of an error and/or other issue in service 610 execution can include memory adjustment, code adjustment, data adjustment, thread adjustment, etc.

For example, a remediation adjustment can include one or more actions taken by a workload execution/task execution manager (e.g., a scheduler, an orchestrator, a service, etc.). For example, an edge orchestrator can direct one or more workload execution manager services using an SLA/SLO that provides performance, security, reliability, and other parameters applicable to the service 610 or other task being evaluated. Adjustments can be made with in the broader SLO context, in which historical executions and peer node executions of the same or similar workload provide a range of expected metrics related to, for example, memory usage, code path/inner loop behavior, data consumed/processed/accessed, thread usage patterns, etc. An execution manager can use these heuristics to make fine-grained adjustments to improve workload execution (e.g., based on the SLO context for operational trade-offs; performance, resiliency, security etc.), for example.

Certain examples provide the distributed tracing framework 520 running on an edge service/node with access to a cloud infrastructure as well as to one or more connected endpoint devices to deploy intermediaries, collect traces and associated metadata, analyze the traces and associated metadata, and perform remediation with respect to services executing on the cloud, the edge, and/or the endpoint device.

Figure 7:
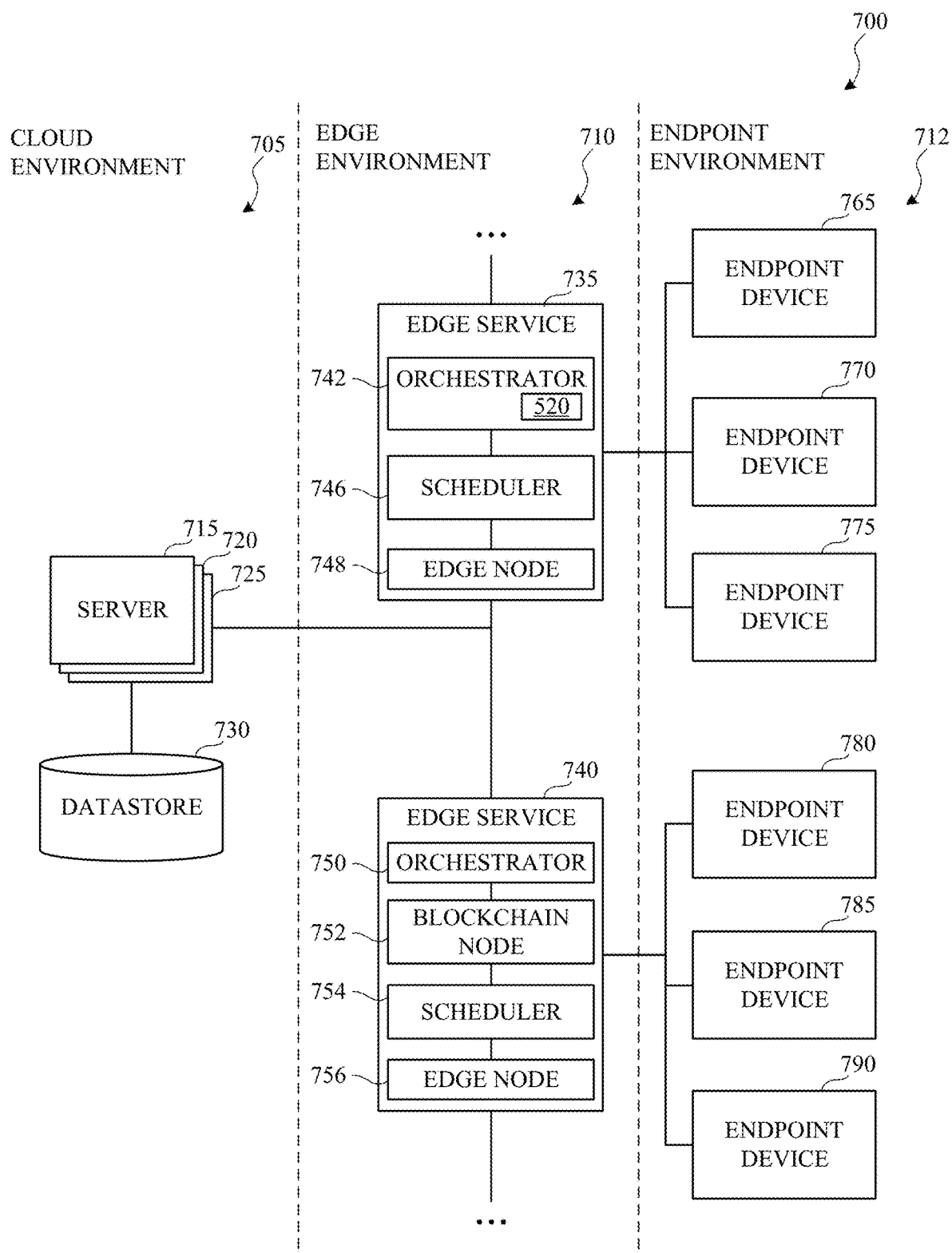
FIG. 7 illustrates an example environment of use including an example cloud environment, an example edge environment, and an example endpoint environment.

FIG. 7 depicts an example environment 700 of use including an example cloud environment 705, an example edge environment 710, and an example endpoint environment 712. Services can execute and/or otherwise exist in one or more of the example cloud environment 705, the example edge environment 710, and the example endpoint environment 712. The cloud environment 705 includes a first example server 715, a second example server 720, a third example server 725, and an example datastore 730. The servers 715, 720, 725 can execute centralized applications (e.g., website hosting, data management, machine learning model applications, responding to requests from client devices, etc.). The datastore 730 can store information such as database records, website requests, machine learning models, results of executing machine learning models, other service execution results, traces, code, etc.

While the example of FIG. 7 shows three servers 715-725 included in the cloud environment 705, the cloud environment 705 can include any number of servers. Likewise, while the cloud environment 705 includes one datastore, any number of datastores can be included in the cloud environment 705. The servers 715, 720, 725 can communicate to devices in the edge environment 710 and/or the endpoint environment 712 via a network such as the Internet. The datastore 730 can provide and/or store data records in response to requests from devices in the cloud environment 705, the edge environment 710, and/or the endpoint environment 712.

The edge environment 710 (e.g., an edge infrastructure) includes a first example edge service 735 and a second example edge service 740. In the illustrated example of FIG. 7, the first edge service 735 corresponds to a first EPH and the second edge service 740 corresponds to a second EPH. The first edge service 735 includes an example orchestrator 742, an example scheduler 746, and an example edge node 748 corresponding to a first example EPH node. The second edge service 740 includes an example orchestrator 750, an example blockchain node 752, an example scheduler 754, and an example edge node 756 corresponding to a second example EPH node. The edge services 735, 740 are in communication with each other and with the servers 715, 720, 725 in the cloud environment 705. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. While the example orchestrator 742, 750 and the example scheduler 746, 754 are shown implemented in the example edge environment 710, the orchestrator 742, 750 and/or the example scheduler 746, 754 can exist in the cloud environment 705, the edge environment 710, and/or the endpoint environment 712.

The edge services 735, 740 can execute workloads on behalf of devices located in the cloud environment 705, the edge environment 710, and/or the endpoint environment 712. The edge services 735, 740 can communicate with devices in the environments 705, 710, 712 (e.g., the first server 715, the datastore 730, etc.) via a network such as the Internet. Further, the edge services 735 can communicate with elements in the environments 705, 710, 712 wirelessly (e.g., via cellular communications, satellite communications, etc.). For example, the edge service 735 can be connected to (e.g., in communication with) a cellular base station included in the cloud environment 705 and connected to the first server 715. As used herein, the phrase "connected to," including variations thereof, encompasses direct communication and/or indirect communication between devices that are connected.

The endpoint environment 712 includes a first example endpoint device 765, a second example endpoint device 770, a third example endpoint device 775, a fourth example endpoint device 780, a fifth example endpoint device 785, and a sixth example endpoint device 790. In the example illustrated in FIG. 7, the first endpoint device 765, the second endpoint device 770, and the third endpoint device 775 are connected to the first edge service 735. Similarly, in the illustrated example, the fourth endpoint device 780, the fifth endpoint device 785, and the sixth endpoint device 790 are connected to the second edge service 740. However, the endpoint devices 765, 770, 775, 780, 785, 790 can be connected to any number of edge services, servers (e.g., the servers 715, 720, 725), and/or any other suitable devices included in the environments 705, 710, 712. For example, the first endpoint device 765 can be connected to the edge services 735, 740 and to the second server 720. Any of the endpoint devices 765, 770, 775, 780, 785, 790 can connect to devices in the environments 705, 710, 712 via a network such as the Internet. In some examples, the endpoint devices 765, 770, 775, 780, 785, 790 can be connected to one or more cellular base stations included one of the environments 705, 710, 712. For example, the first endpoint device 765 can be connected to a cellular base station included in the edge environment 710, and the cellular base station can be connected to the first edge service 735. Further, any number of endpoint devices may be included in the endpoint environment 712. In some examples, one or more of the endpoint devices 765, 770, 775, 780, 785, 790 can be a user device, such as a smartphone, a personal computer, a tablet, etc.

In response to a request to execute a workload from an endpoint device (e.g., the endpoint device 765), an orchestrator (e.g., the orchestrator 742) communicates with at least one edge node and an endpoint device to create a contract (e.g., an SLA) associated with a description of the workload to be executed. The endpoint device 765 provides an execution environment for a task associated with the contract and the description of the workload to the orchestrator 742, and the orchestrator 742 provides the task to a scheduler (e.g., the scheduler 746). The task can include the contract and the description of the workload to be executed. In some examples, the task can include tokens (such as a micropayment, an e-currency) to acquire resources used to execute a workload. In some examples, the task can include a count of tokens to be provided in response to an execution of a workload.

As shown in the example of FIG. 7, the orchestrator 742 can include the distributed tracing framework 520. Alternatively or additionally, the distributed tracing framework 520 can be implemented in the edge node 748. In certain examples, the scheduler 746 implements distributed tracing and analysis of services on one or more devices 765-790 in the endpoint environment 712 using the edge node 748 based on instructions from the orchestrator 742.

In certain examples, transactions, traces, error detection, remediation, etc., can be stored and tracked in a distributed ledger such as a blockchain, etc. A blockchain node (e.g., the blockchain node 752) maintains records and/or logs of actions occurring in the environments 705, 710, 712. In some examples, the blockchain node 752 can include a Merkle tree, and the blockchain node 652 can supply proof of delivery of a contract, bid, offer, result, etc., for parties involved in transactions, such as the endpoint device 765, the orchestrator 742, the edge node 748, and/or any devices included in the environments 705, 710, 712. For example, the edge node 748 can notify receipt of a workload description to the blockchain node 752. Any of the orchestrators 742, 750, the workload schedulers 746, 754, and/or the edge nodes 748, 756 can provide records of actions and/or tokens to the blockchain nodes 744, 752. For example, the orchestrator 742 can provide a record of receiving a request to execute a workload (e.g., a contract request provided by the endpoint device 765) to the blockchain node(s) 752. The blockchain node 752 can be implemented as a centralized server in the cloud environment 705, for example. Further, any device in the environment 700 (e.g., the endpoint device 765) can provide records and/or tokens to the blockchain node 752. For example, an endpoint device 765 can accept a contract (such as an SLA, an e-contract, etc.) provided by the orchestrator 742 and provide a notice of contract acceptance to the blockchain node 752. In some examples, the blockchain node 752 can be implemented as a service hosted by a centralized server (e.g., the first server 715).

The scheduler 746 accesses a task from the orchestrator 742 and provides the task to the edge node 748. The edge node 748 executes the workload based on a description of the workload included in the task. For example, the task can be an intermediary insertion, a trace point insertion, a monitoring instruction for a service, a trace extraction, an intermediary adjustment, an analysis, a remediation, etc. The scheduler 7646 accesses a result of the execution of the workload and/or tokens from the edge node 748. The scheduler 746 provides the result to the endpoint device 765. In some examples, the scheduler 746 retains a portion of the tokens accessed from the edge node 748 and/or provides the tokens to the orchestrator 742, the endpoint device 765, and/or resource providers.

The edge node 748 accesses a task from the scheduler 746 and executes a workload based on a description of the workload included in the task. For example, the edge node 748 inserts one or more tracing intermediaries 720-726 and/or one or more verification intermediaries 730-732 to monitor execution of a task across one or more endpoint devices 765-775. a trace point insertion, a monitoring, a trace extraction, an intermediary adjustment, an analysis, a remediation, etc. The edge node 748 provides at least one result of the execution of the workload to the scheduler 746 and distributes tokens to resource providers, such as energy provider and/or an EPH provider. In some examples, an EPH provider can provide infrastructure services (e.g., maintenance, device support, datacenter services, space allocation, etc.) to an EPH node. In some examples, the edge nodes 748, 756 can provide tokens to the schedulers 746, 754 in response to determining that contract terms associated with an execution of a workload are not met. In some examples, in response to determining that contract terms are not met, the edge nodes 748, 756 can request additional tokens from the schedulers 746, 754, the orchestrators 742, 750, and/or the endpoint device 765.

In the example illustrated in FIG. 7, the orchestrator 742, the scheduler 746, and the edge node 748 are included in the edge service 735. However, in some examples, the orchestrator 742, scheduler 746, and/or the edge node 748 are included in the edge environment 710 rather than in the edge service 735. For example, the orchestrator 742 can be connected to the cloud environment 705 and/or the endpoint environment 712 outside of the edge service 735. In another example, the orchestrator 742, the scheduler 146, and/or the edge node 748 is/are separate devices included in the edge environment 710. Further, any of the orchestrator 742, the scheduler 746, or the edge node 748 can be included in the cloud environment 705 or the endpoint environment 712. For example, the orchestrator 742 can be included in the endpoint environment 712, in the first server 715 in the cloud environment 705, etc. In some examples, the scheduler 746 can be included in the orchestrator 742 rather than in the edge service 735. In some examples, the edge services 735, 740 can be distributed and performed among two or more peer devices (such as two or more edge servers) included in the edge environment 710.

An execution of a workload in the edge environment 710 can reduce computation costs and/or processing time used to execute the workload relative to an execution of the workload in the cloud environment 705. For example, an endpoint device 765-790 can request an edge service 735, 740 to execute a workload at a cost lower than a cost needed to execute the workload in the cloud environment 705. In some examples, multiple edge services 735, 740 can compete to receive a task to execute a workload, and each edge service 735, 740 can provide a bid including a workload execution cost to the orchestrator 742 and/or to the endpoint device 765. Each bid can include a different workload execution cost, and an edge service 735, 740 can lower a respective workload execution cost relative to other bids in order to be selected to execute the workload. Thus, a workload execution cost in the edge environment 710 may be lower than a workload execution cost in the cloud environment 705 provided by a centralized server (e.g., the first server 715).

In another example, an endpoint device 765-790 can be nearer to an edge service 735, 740 than a centralized server in the cloud environment 705. For example, the edge service 735 is closer in proximity to the endpoint device 765 than the first server 715. As a result, the endpoint device 765 can request the edge service 735 to execute a workload, and the response time of the edge service 735 to deliver the executed workload result is lower than that of the first server 715 in the cloud environment 705.

Consistent with the examples provided herein, an endpoint device (e.g., one of the endpoint devices 765, 770, 775, 780, 785, 790) can be implemented as any type of endpoint component, device, appliance, or other thing capable of communicating as a producer or consumer of data. For example, an endpoint device can include a mobile phone, a laptop computer, a desktop computer, a processor platform in an autonomous vehicle, etc. In additional or alternative examples, an endpoint device can include a camera, a sensor, etc. Further, the label "platform," "node," and/or "device" as used in the environment 700 does not necessarily mean that such platform, node, and/or device operates in a client or agent/minion/follower/secondary role; rather, any of the platforms, nodes, and/or devices in the environment 700 refer to individual entities, platforms, nodes, devices, and/or subsystems which include discrete and/or connected hardware and/or software configurations to facilitate and/or use the edge environment 710.

In some examples, the edge environment 710 is formed from network components and functional features operated by and within the edge services 735 (e.g., the orchestrator 742, the edge node 748, etc.). The edge environment 710 can be implemented as any type of network that provides edge computing and/or storage resources which are proximately located to radio access network (RAN) capable endpoint devices (e.g., mobile computing devices, IoT devices, smart devices, etc.), which are shown in FIG. 7 as the endpoint devices 765, 770, 775, 780, 785, 790. In other words, the edge environment 710 can be envisioned as an "edge" which connects the endpoint devices 765, 770, 775, 780, 785, 790 and traditional network access points that serves as an ingress point into service provider core networks, including mobile carrier networks (e.g., Global System for Mobile Communications (GSM) networks, Long-Term Evolution (LTE) networks, 5G and/or Sixth Generation (6G) networks, etc.), while also providing storage and/or compute capabilities. Other types and forms of network access (e.g., Wi-Fi, long-range wireless, wired networks including optical networks, etc.) can also be utilized in place of or in combination with such 3rd Generation Partnership Project (3GPP) carrier networks.

Figure 8:
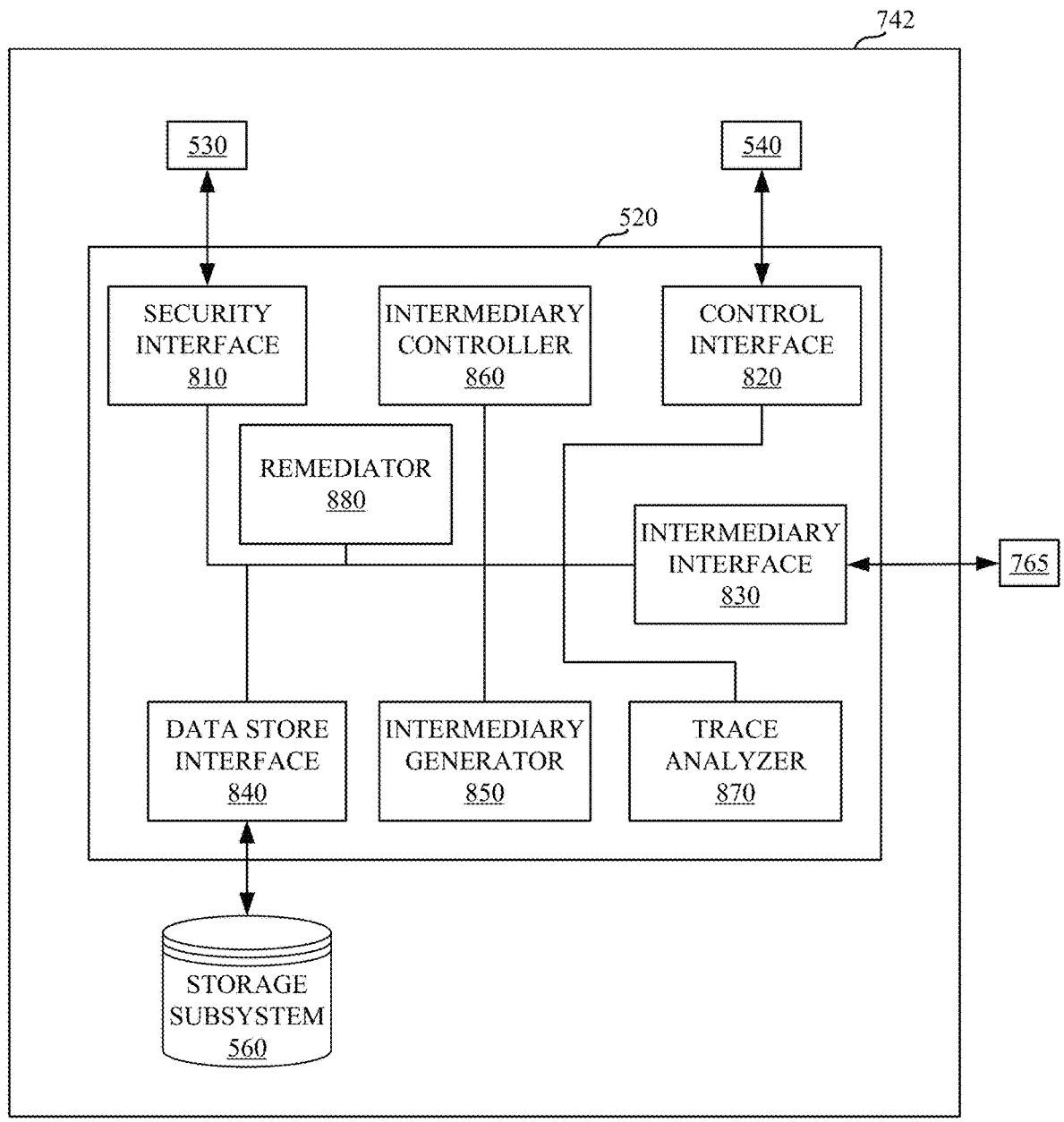
FIG. 8 is a block diagram of the example distributed tracing framework of FIG. 5B.

FIG. 8 is a block diagram of an example implementation of the example distributed tracing framework 520 on the example orchestrator 742. As shown in the example of FIG. 8, the example distributed tracing framework 520, the example security policy engine 530, the example DevOps framework 540, and the example datastore 560 can be implemented in the example orchestrator 742. In other examples, one or more of the example distributed tracing framework 520, the example security policy engine 530, the example DevOps framework 540, and the example datastore 560 can be implemented in the example edge node 748 and/or other elements of the example edge service 735, the example edge environment 710, etc.

The example distributed tracing framework 520 shown in FIG. 8 includes a security interface 810, a control interface 820, an intermediary interface 830, a data store interface 840, an intermediary generator 850, an intermediary controller 860, a trace analyzer 870, and a remediator 880. As shown in the example of FIG. 8, the example orchestrator 742 of the example edge service 735 receives an instruction to trace and/or otherwise monitor execution of a service 610 and works with the scheduler 746 and the edge node 748 to deploy intermediaries 620-632 and monitor the service 610. The monitoring is distributed through the intermediaries and can cross device 765-790 boundaries as well as cloud 705, edge 710, and endpoint 712 environment boundaries. In certain examples, the service 610 runs in an SB or other EV 222-226 on one or more endpoint devices 765-790.

For example, in response to a tracing and/or other service/software monitoring request, the example intermediary generator 850 creates one or more tracing intermediaries 620-626, verification intermediaries 630-632, etc. In certain examples, attestation may be involved to intermediary 620-632 creation, as facilitated by the security policy engine 530 via the security interface 810. In the example of FIG. 8, the generated intermediary(-ies) 620-632 are deployed via the intermediary interface 830 to monitor the service 610 executing on the endpoint device 765. The example intermediary interface 830 can also be used to gather information from the intermediaries 620-632.

In certain examples, the DevOps framework 540 programmatically controls input/output and other data flow associated with monitoring of the service 610 by the intermediaries 620-632. One or more elements of the distributed tracing framework 520 can communicate with the DevOps framework 540 via the control interface 820 and provide dynamic analysis, visualization, statistic extraction, etc., via the intermediary interface 830 and/or from the DevOps framework 540 itself. The intermediary controller 860 can leverage the DevOps framework 520 to provide functions to control program and monitored data flow via the intermediaries 620-632 deployed with respect to the service 610. Based on captured data, feedback, etc., from the intermediaries 620-632, the intermediary controller 860 can change intermediary 620-632 configuration, behavior, deployment, etc. For example, the intermediary controller 860 can adjust a parameter of an intermediary 620-632, can deploy another intermediary 620-632, can withdraw or deactivate an intermediary 620-632, etc.

The example trace analyzer 870 can collect trace data, associated metadata, and/or other monitoring information via the intermediary interface 830 and analyze feedback from the one or more tracing intermediaries 620-626 and/or the one or more verification intermediaries 630-632 to evaluate execution and/or other operation of the service 610. In certain examples, the trace analyzer 870 works with the intermediary controller 860 to analyze verification and/or trace data and provide feedback regarding service 610 operation, etc.

As shown in the example of FIG. 8, the data store interface 840 stores the flow of traced/monitored information from the intermediaries 620-632 to the storage subsystem 560. The example storage subsystem 560 can include local and/or remote volatile memory, local and/or remote non-volatile memory, local and/or remote block-storage, a thin provisioned file system, blockchain data storage, etc. The data stored through the example data store interface 850 also includes one or more markers that identify (a) source(s) of stored trace(s) (e.g., the associated tap points 510-515, intermediaries 620-632, etc.), and (b) attestation and privileges that apply to the data produced at the trace source(s) points, so that information filtering and transformation can be performed in conjunction with retrieval of information from the data store 560. Data stored can also include (c) debugging and/or tracing data collected and marked (e.g., annotated) to be stored securely in the storage subsystem 560. The stored data can be automatically life-cycle-managed, so that stored data is summarized and then removed or moved into "cold" storage (e.g., non-volatile, slower-access, longer-term storage, etc.) after being retained on-line for a period of time as specified by the DevOps framework 540, for example.

In certain examples, metadata is stored in the example storage subsystem 560 along with captured traces. The metadata includes high resolution timestamps, as well as an indication of whether or not the timestamps are local or global timestamps, for example. The metadata can also include identifiers available directly (e.g., explicitly) at the time of trace collection, such as a process, identifier, a thread identifier, a sandbox identifier, etc. The metadata can also include identifiers available indirectly by a specified extraction format from the DevOps framework 540, for example. An example of an indirect identifier is an end to end flow of operations across different services in the context of providing value to a given end user or service (e.g., a user-identifier and a request identifier that are associated with streaming video to a particular end user, etc.).

In certain examples, the intermediary controller 860 is in interactive communication with and has control of one or more intermediaries 620-632 while the service 610 executes. Based on collected trace, metadata, and/or other monitoring information, the intermediary controller 860 can identify an error, insufficiency, and/or other issue with execution of the service 610 (e.g., in an SB or other EV on the endpoint device 765, etc.). The example remediator 880 can communicate with the intermediary(-ies) 620-632 via the intermediary interface 830 to adjust one or more intermediaries 620-632, adjust code, data, memory, thread, and/or other parameter of the service 610, adjust configuration of the EV 222-226, adjust configuration of the endpoint device 765, etc. The example remediator 880 can engage the example scheduler 746 (e.g., an execution manager implemented by the scheduler 746, etc.), the example orchestrator 742, the example edge node 748, the example endpoint device 765-790, and/or a separate "standalone" service, process, virtual machine, etc., to adjust execution, for example. As such, the example remediator 880 can remediate (e.g., correct and/or otherwise address, etc.) an error (e.g., wrong value, wrong computation, etc.), insufficiency (e.g., failure to meet an SLA, etc.), and/or other issue with the service 610 and/or its host environment 765, for example. Working with the remediator 880, the intermediary controller 860 can control, halt, adjust, and release one or more intermediaries 620-632 and associated service 610 execution to help ensure correct service 610 operation on one or more endpoint devices 765-790. In certain examples, the remediator 880 includes an alert-handler script triggered by the intermediary controller 860 in response to information from one or more intermediaries 620-632 to address a failure associated with the service 610.

In certain examples, trust or trace intermediaries 620-626 can perform directed checks in-band without verification intermediaries 630-632. As qualified by the outcomes of these directed checks, the intermediaries 620-626 can extract trace data and filter the trace data for logging and/or for supplying to one or more collectors, such as the storage subsystem 560, for example.

In certain examples, markers generated over traced collections may be placed in a distributed ledger (e.g., the blockchain node 752, etc.). In certain examples, markers carry verification information from verifier intermediaries 630-32 to establish proof of correct operation of the service 610 and/or other application and to support collective debugging/verification procedures spanning different trust boundaries.

As such, while applications using message passing interfaces are debugged through a console in which the different instances, shards, ranks, or processes are tracked and controlled from one point, such a method is not viable for ad-hoc clusters of applications running in independent security domains and heterogeneous sandboxes. Certain examples enable dynamic intermediary 620-632 deployment and reactive tracing control to deploy, monitor, and adjust/remediate to help ensure proper service/application execution, operation, etc.

In certain examples, the remediator 880 can maintain a count of tokens as well as a tally of tracing metrics that are charged to a count of tokens (or micro-tokens) such that when a threshold of tracing metrics are used (e.g., consumed) by a task, the token can be charged to the workload and consumed by the remediator 880 as payment for the task. This "pay-as-you-go" approach that does not depend on an SLA settlement process, which may occur a long time after a workload is complete and can involve separate settlement network.

In certain examples, the remediator 880 interfaces with the blockchain node 752 to log or otherwise record metrics, token counts, transactions, etc. Alternatively or additionally, a local blockchain capability can be integrated into the example edge service 742 in which the example remediator 880 interacts with the local blockchain controller to help ensure payment and other timely historical context are efficiently processed to the blockchain.

The example security interface 810, the example control interface 820, the example intermediary interface 830, the example data store interface 840, the example intermediary generator 850, the example intermediary controller 860, the example trace analyzer 870, the example remediator 880, and/or, more generally, the example distributed tracing framework 520, and/or the example security policy engine 530, the example DevOps framework 540, the example storage subsystem 560, the example orchestrator 742, and/or, more generally, the example edge service 735 of the illustrated examples of FIGS. 5B and/or 8 is/are implemented by a logic circuit such as a hardware processor. However, any other type of circuitry can additionally or alternatively be used such as one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), Coarse Grained Reduced precision architecture (CGRA(s)), image signal processor(s) (ISP(s)), etc. In some examples, the example security interface 810, the example control interface 820, the example intermediary interface 830, the example data store interface 840, the example intermediary generator 850, the example intermediary controller 860, the example trace analyzer 870, the example remediator 880, and/or, more generally, the example distributed tracing framework 520, and/or the example security policy engine 530, the example DevOps framework 540, the example storage subsystem 560, the example orchestrator 742, and/or, more generally, the example edge service 735 are implemented by separate logic circuits. In some examples, the example intermediary generator 850 implements means for generating. In some examples, the example intermediary controller 860 implements means for monitoring. In some example, the remediator 880 implements means for remediating.

While an example implementation of the distributed tracing framework 520 of FIG. 5 is illustrated in FIG. 8 and an example implementation of the network environment 700 is illustrated in FIG. 7, one or more of the elements, processes and/or devices illustrated in FIGS. 1-8 can be combined, divided, re-arranged, omitted, eliminated and/or implemented in any other way. Further, the example security interface 810, the example control interface 820, the example intermediary interface 830, the example data store interface 840, the example intermediary generator 850, the example intermediary controller 860, the example trace analyzer 870, the example remediator 880, and/or, more generally, the example distributed tracing framework 520, and/or the example security policy engine 530, the example DevOps framework 540, the example storage subsystem 560, the example intermediaries 620-632, the example orchestrator 742, the example edge service 735, and/or, more generally, the example environment 700 can be implemented by hardware, software, firmware and/or any combination of hardware, software and/or firmware. Thus, for example, any of the example security interface 810, the example control interface 820, the example intermediary interface 830, the example data store interface 840, the example intermediary generator 850, the example intermediary controller 860, the example trace analyzer 870, the example remediator 880, and/or, more generally, the example distributed tracing framework 520, and/or the example security policy engine 530, the example DevOps framework 540, the example storage subsystem 560, the example intermediaries 620-632, the example orchestrator 742, the example edge service 735, and/or, more generally, the example environment 700 can be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example security interface 810, the example control interface 820, the example intermediary interface 830, the example data store interface 840, the example intermediary generator 850, the example intermediary controller 860, the example trace analyzer 870, the example remediator 880, and/or, more generally, the example distributed tracing framework 520, and/or the example security policy engine 530, the example DevOps framework 540, the example storage subsystem 560, the example intermediaries 620-632, the example orchestrator 742, the example edge service 735, and/or, more generally, the example environment 700 is/are hereby expressly defined to include a non-transitory computer readable storage device or storage disk such as a memory, a digital versatile disk (DVD), a compact disk (CD), a Blu-ray disk, etc. including the software and/or firmware. Further still, the example distributed tracing framework 520 of FIGS. 5B and/or 8, the example network environment 700 of FIG. 7, etc., can include one or more elements, processes and/or devices in addition to, or instead of, those illustrated in FIGS. 5B, 7, and/or 8, and/or can include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 9:
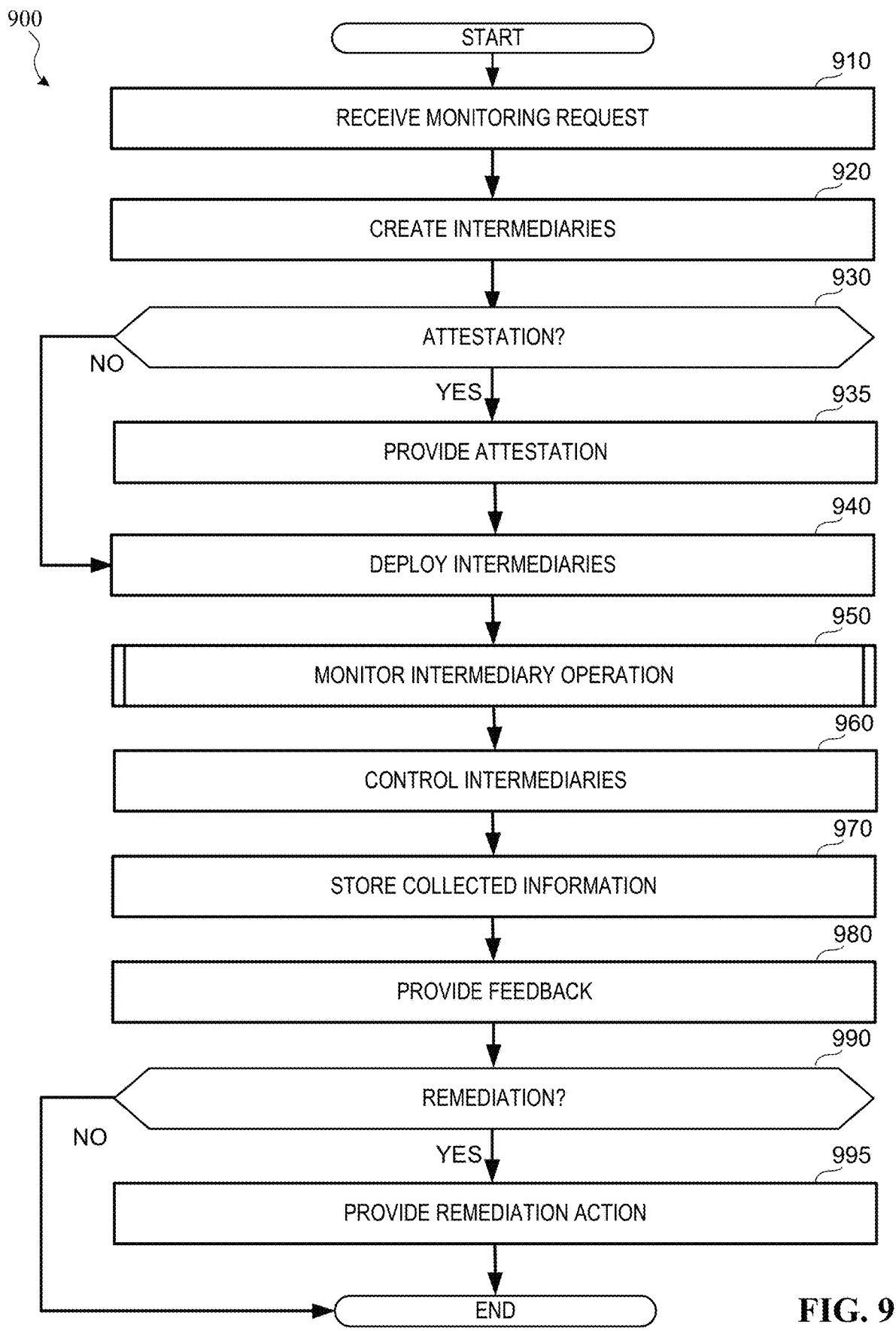
FIGS. 9-10 are flowcharts representative of example machine-readable instructions that can be executed to implement all or part of the example distributed tracing framework of FIGS. 5B and/or 8.
Figure 10:
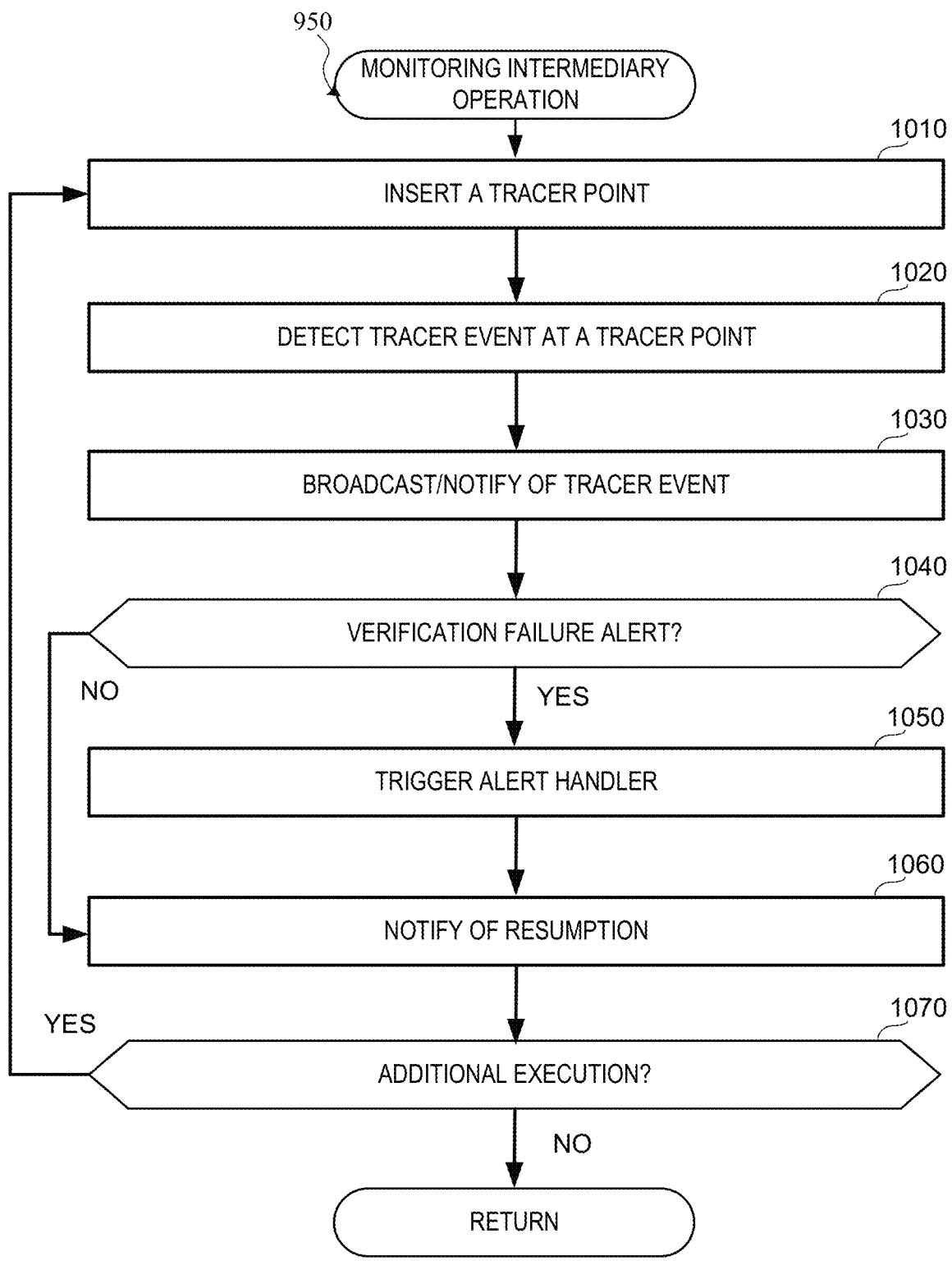

Flowcharts representative of example hardware logic, machine readable instructions, hardware implemented state machines, and/or any combination thereof for implementing the example distributed tracing framework 520 of FIGS. 5B and/or 8 is shown in FIGS. 9-10. The machine readable instructions can be one or more executable programs or portion(s) of an executable program for execution by a computer processor and/or processor circuitry, such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowcharts illustrated in FIGS. 9-10, many other methods of implementing the example distributed tracing framework 520 can alternatively be used. For example, the order of execution of the blocks can be changed, and/or some of the blocks described can be changed, eliminated, or combined. Additionally or alternatively, any or all of the blocks can be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry can be distributed in different network locations and/or local to one or more devices (e.g., a multi-core processor in a single machine, multiple processors distributed across a server rack, etc.).

The machine readable instructions described herein can be stored in one or more of a compressed format, an encrypted format, a fragmented format, a compiled format, an executable format, a packaged format, etc. Machine readable instructions as described herein can be stored as data or a data structure (e.g., portions of instructions, code, representations of code, etc.) that may be utilized to create, manufacture, and/or produce machine executable instructions. For example, the machine readable instructions can be fragmented and stored on one or more storage devices and/or computing devices (e.g., servers) located at the same or different locations of a network or collection of networks (e.g., in the cloud, in edge devices, etc.). The machine readable instructions may involve one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions can be stored in multiple parts, which are individually compressed, encrypted, and stored on separate computing devices, wherein the parts when decrypted, decompressed, and combined form a set of executable instructions that implement one or more functions that can together form a program such as that described herein.

In another example, the machine readable instructions can be stored in a state in which they can be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 9 and/or 10 can be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 9 is a flowchart representative of example machine-readable instructions that can be executed to implement the example distributed tracing framework system or apparatus 520 of FIGS. 5B and/or 8. The example process 900 of the illustrated example of FIG. 9 begins when the example intermediary generator 850 (FIG. 8) receives a monitoring request (e.g., from the example DevOps framework 540, the example security protocol engine 530, and/or other part of the example edge service 735, etc.). (Block 910). For example, the intermediary generator 850 receives a request to trace execution of the service 202-206, 610 via the orchestrator 742 of the edge service 735.

In response to the request, the example intermediary generator 850 creates one or more tracing intermediaries 620-626, verification intermediaries 630-632, etc. (Block 920). In certain examples, an attestation or other security check may be involved with releasing the intermediaries 620-632 for deployment. (Block 930). If so, then the security policy engine 530 works with the intermediary generator 850 to provide attestation of intermediary 620-632 integrity, service 202-206, 610 integrity, etc. (Block 935). For example, one or more intermediaries 620-632 can include a hash and/or other fingerprint to verify their source and/or authenticity and/or to trigger authentication of all or part of the code of the service 202-206, 610 to be monitored. As such, the intermediary 620-632 carries a security marker or other attestation so that a resulting trace is properly attested to the distributed tracing framework 520, for example.

The example intermediary generator 850 then deploys the one or more configured intermediaries 620-632 to the example endpoint device 765 and/or other location in which the service 202-206, 610 to be monitored is running. (Block 940). For example, the one or more intermediaries 620-632 can be deployed and inserted into the computational graph or tree, etc., forming execution of the service 202-206, 610 in a SB and/or other EV on the device 765, etc. For example, the intermediary generator 850, with or without input from the DevOps framework 540, provides the one or more intermediaries 620-632 to the device 765 via the intermediary interface 830 to operate in conjunction with one or more trace points 510-515 positioned with respect to one or more EVs 222-226 for one or more services 610, 202-206 executing on the endpoint device 765 (or multiple endpoint devices 765-790). For example, one or more virtual machines, containers, and/or other process can form an execution environment (e.g., the EV(s) 222-226, etc.) for execution of the service 202-206, 610 and/or other task on one or more endpoint devices 765-790.

For example, computations provided by microservices (e.g., services 202-206, 610) can be described by a computational graph (e.g., graph 200, 500, etc.). The nodes of the graph can be mapped to put different services 202-206, 610 in different SBs and/or other EVs 222-224 on one or more endpoint devices 765-790. The EVs 22-224 may not be instrumentable, so the intermediaries 620-632 can be deployed to correlate activities of the service(s) 202-206, 610 with other network activity. Since communication may come through memory, etc., not just wired or wireless connection, packet sniffing is insufficient to coordinate and collect traces. Instead, intermediaries 620-32 and associated trace points 510-515 can be used to integrate with services 202-206, 610 across multiple EVs 222-226, multiple devices 765-790, etc., to gather a more complete picture of service 202-206, 610 execution within the environment 712, for example. Such a distributed system enables debugging and tracing of multiple services 202-206, 610 at scale across multiple devices 765-790 including interactions that cross EV 222-226 and/or device 765-790 boundaries, which can still be correlated by the intermediary controller 860 through the deployed network of tracing and verification intermediaries 620-632. Using the intermediaries 620-632, the intermediary controller 860 and the trace analyzer 870 (with or without the DevOps framework 540, for example) can look at the whole environment 712 and then focus in on a particular area to evaluate a proximate cause of a problem, for example.

The example intermediary controller 860 and the trace analyzer 870 monitor operation of the intermediaries 620-632 with respect to the service 202-206, 610. (Block 950). For example, the intermediary controller 860 receives trace and/or other monitoring data, status indicators, other feedback, etc., from one or more of the intermediaries 620-632 deployed to monitor the service 202-206, 610. The intermediary controller 860 receives requests and performs operations with respect to intermediaries 620-632 and/or data provided by intermediaries 620-632 to facilitate debugging, tracing, diagnostics collection, diagnostic program execution, etc., with respect to one or more services 202-206, 610.

In certain examples, a root or computation subtree of a node 202-210 can be collected in a graph to be analyzed by the trace analyzer 870 to determine interactions in a subtree, etc. Interactions can include RPCs, event signals, event waiting, etc. The intermediaries 620-632 facilitate trace collection across interactions. For example, the tracing intermediaries 620-626 can be implemented as a tree of interception procedures placed with respect to the service 202-206, 610 to monitor a forward and/or return path between nodes or portions of the service 202-206, 610 code execution to collect a trace defining interaction between parts of the service 202-206, 610, between services 202-206, 610, etc.

Based on feedback from the intermediaries 620-632 and the trace analyzer 870, the example intermediary controller 860 can control configuration, operation, arrangement, etc., of the intermediaries 62-632 with respect to one or more services 202-206, 610. (Block 960). For example, intermediaries 620-632 can be placed, removed, reconfigured, etc., by the intermediary controller 860 based on information from the intermediaries 620-632 and/or analysis from the trace analyzer 870, etc. For example, the intermediaries 620-632 may be initially deployed to collect tracers of interest at certain critical points with respect to the service(s) 202-206, 610 with a high level of detail (e.g., minimal information regarding each point, etc.). However, if a problem is detected or an operating mode switches from monitoring to debugging or diagnostics, the intermediary controller 860 can adjust the level of detail collected by one or more of the intermediaries 620-632 (e.g., level 0, 1, 2, etc.) to capture more information such as communication tags, storage tags, etc. In certain examples, the DevOps framework 540 can provide (or help provide) operational control over the intermediaries 620-632 to drive tracers in a flexible manner (e.g., change tracing points, change config of tracing points, alter flow of tracing points, etc.). The automated monitoring and control of intermediaries 620-632 reduces latency and increases responsiveness/reactability to issues appearing in service 202-206, 610 execution (e.g., caused by the service 202-206, 610 and/or other system factors impacting execution of the service 202-206, 610, etc.).

Collected traces, metadata, and associated analysis can be sent to the storage subsystem 560 (e.g., local and/or distribute memory and/or other data storage, etc.) for compilation, further analysis, short/long-term storage, etc. (Block 970). Metadata such as timing information, etc., can be stored in association with the trace to aid in further analysis, for example.

The trace analyzer 870, intermediary controller 860, remediator 880, etc., can provide feedback or other reporting to the intermediaries 620-632, the scheduler 746, the orchestrator 742, the edge node 748, the blockchain distributed ledger 752, the server 715-725, the endpoint device 765-790, and/or other device. (Block 980). The feedback can be used to define or explain the status of the service 202-206, 610, operation of the service 202-206, 610, impact on device(s) 765-790 executing the service 202-206, 610, etc., and can aid in further improvement to the service 202-206, 610, EV 222-226 allocation for service(s) 202-206, 610, endpoint device 765-790 configuration for service(s) 202-206, 610, etc. In certain examples, traces can be annotated and/or otherwise marked for querying independent of the framework 520 and associated intermediaries 620-632 to reconstruct problems in execution of the service 202-206, 610. In certain examples, different attested markers in a trace can have different levels of privilege, and different privilege levels across EVs 222-226, devices 765-790, etc., represented in a trace can be handled using the attested markers provided by intermediaries 620-632 in association with the markers in the trace.

In certain examples, the distributed tracing framework 520 can take action to remediate an error discovered in operation of the service 202-206, 610 based on monitoring/trace information. (Block 990). If remediation is to occur, then the remediator 880 provides a remediation action to the service 202-206, 610, EV 222-226 running the service 202-206, 610, endpoint device 765-790 housing the EV 222-226, etc. (Block 995). For example, the remediator 880 can adjust a parameter, setting, variable, code, etc., of the service 202-206, 610. The remediator 880 can adjust a parameter, setting, relationship, etc., of the EV(s) 222-226 in which the service 202-206, 610 is executing, for example. The remediator 880 can adjust a parameter, setting, other configuration, etc., of the endpoint device(s) 765-790 in which the service 202-206, 610 and/or its EV 222-226 is running, for example. The remediator 880 can also adjust one or more intermediaries 620-632 as a result of trace analysis, etc. As such, the remediator 880 can automatically react and adjust to issue(s) identified in the monitoring of the service(s) 202-206, 610 in the endpoint environment 712 using the distributed tracing framework 520.

The example process 900 of the illustrated example of FIG. 9 then terminates but may be repeated in response to a subsequent tracing and/or other monitoring request.

FIG. 10 is a flowchart providing further example detail regarding monitoring intermediary operation and associated service 202-206, 610 tracing (Block 950 of the example of FIG. 9), representative of example machine readable instructions that can be executed to implement the example intermediary controller of FIG. 8. The example implementation of the process 950 of FIG. 10 is a virtual, interactive, single-stepping monitoring process that begins when a tracer 510-515 and its associated intermediary 620-632 are inserted in a computational graph 200, 500 representing one or more services 202-206, 610 to be monitored. (Block 1010).

In certain examples, the service 202-206, 610 is single-stepped while monitoring and controlling interactions between the service 202-206, 610 and other service(s) 202-206, 610 to which the service being monitored is communicatively coupled. As such, a flexible framework for monitoring one or more services 202-206, 610 is provided. For example, microservices can be loosely coupled execution machines, but, in some of their interactions, the services can be tightly coupled (e.g., one microservice may invoke another through a synchronous gRPC call, etc.). As such, insertion of tracer points 510-515 and associated intermediaries 620-632 (see, e.g., FIGS. 5A-6B and 8) provides a flexible framework 520 for monitoring and understanding a variety of interactions.

A tap or tracer point 510-515, represented by a tracing intermediary 620-626, specifies a tracepoint reached (e.g., in one or more directions) by code execution of the service 202-206, 610 as well as a predicate (e.g., a relationship, a function, a criterion, etc.) to be satisfied upon reaching the tracepoint. Thus, the tracing intermediary 620-626 can watch for a "tracer event" indicating that service 202-206, 610 execution has reached the tracer point 510-515. (Block 1020).

Once the service 202-206, 610 code execution or interaction reaches the corresponding tracepoint and satisfies (or does not satisfy) the associated predicate, the tracing intermediary 620-626 can trigger the verification intermediary 630-632 to verify the predicate and/or other information available at the tracer point 510-515 and generate a notification. (Block 1030). Thus, a notification can arise when the right set of conditions is detected. A lack of notification within a monitored time period or a negative notification (rather than a positive notification) indicate a failure, error, or other problem in execution of code for the service 202-206, 610 or interaction between services 202-206, 610, for example. In certain examples, the notification issues as a broadcast notification or as a multicast notification so that the notification can reach multiple sandboxes 222-226 containing microservices 202-206, 610 whose execution is to be parked while single-stepping through the flow of the microservice 202-206, 610 that has just hit the tracer point. The example intermediary controller 860 (alone or in conjunction with the example trace analyzer 870) collects diagnostics at each step of a single-stepping operation and logs them into a trace for further analysis, visualization, remediation, etc.

During this flow, the monitored service 202-206, 610 can produce a verification failure at one of the verification intermediaries 620-632. (Block 1040). When a verification failure alert is triggered, control can be transferred to an alert-handler script. (Block 1050). For example, the intermediary controller 860 can trigger an alert, an interaction with the DevOps framework 540 and/or the trace analyzer 870, an operation by the remediator 880, etc., to address the verification failure.

Once the analysis is complete, control is returned to the monitored service 202-206, 610 (e.g., via the one or more intermediaries 620-632 and/or other instruction, etc.) by notifying the interrupted service 202-206, 610 (stopped at the tracer point 510-515, together with other affected microservice(s) 202-206, 610. (Block 1060).

If additional code exists for execution of the monitored service 202-206, 610, then control reverts to block 1010 to insert a next tracer pint 510-515. If no execution remains, the example process 950 in the illustrated example of FIG. 10 then terminates but can be repeated, for example, upon a subsequent intermediary monitoring. In the illustrated example, control returns to the example instructions of FIG. 9.

The next tracer or "stop" point 510-515 is identified by the intermediary controller 860 according to a level of granularity associated with the monitoring. The next tracer point can be inserted at the next instruction, for example. Alternatively or additionally, the next tracer point 510-515 point can be described within the code service 202-206, 610 (e.g., a single step to a next high-level functional language statement in the code, etc.). The tracer point 510-515 can be inserted with respect to the single monitored service 202-206, 610 and/or all communicatively coupled microservices 202-206, 610 that are being debugged as a single unit, for example.

Once the next-step tracer point 510-515 is inserted (Block 1010), the service 202-206, 610, together with other service(s) notified at block 1030, are released from the stopped state and permitted to run until the next stop point is hit (e.g., triggered by code execution). At that point, control shifts to block 1020 to detect and process service 202-206, 610 execution/state at that tracer point 510-515. In certain examples, each monitored service 202-206, 610 runs until its own next stop point. In other examples, only the service 202-206, 610 that initiated the previous notification stops while other services 202-206, 610 stop when notified. Once monitoring is complete, the service 202-206, 610 is released from the single-stepping operation mode and execution can then continue normally without tracer points/taps, for example.

Figure 11:
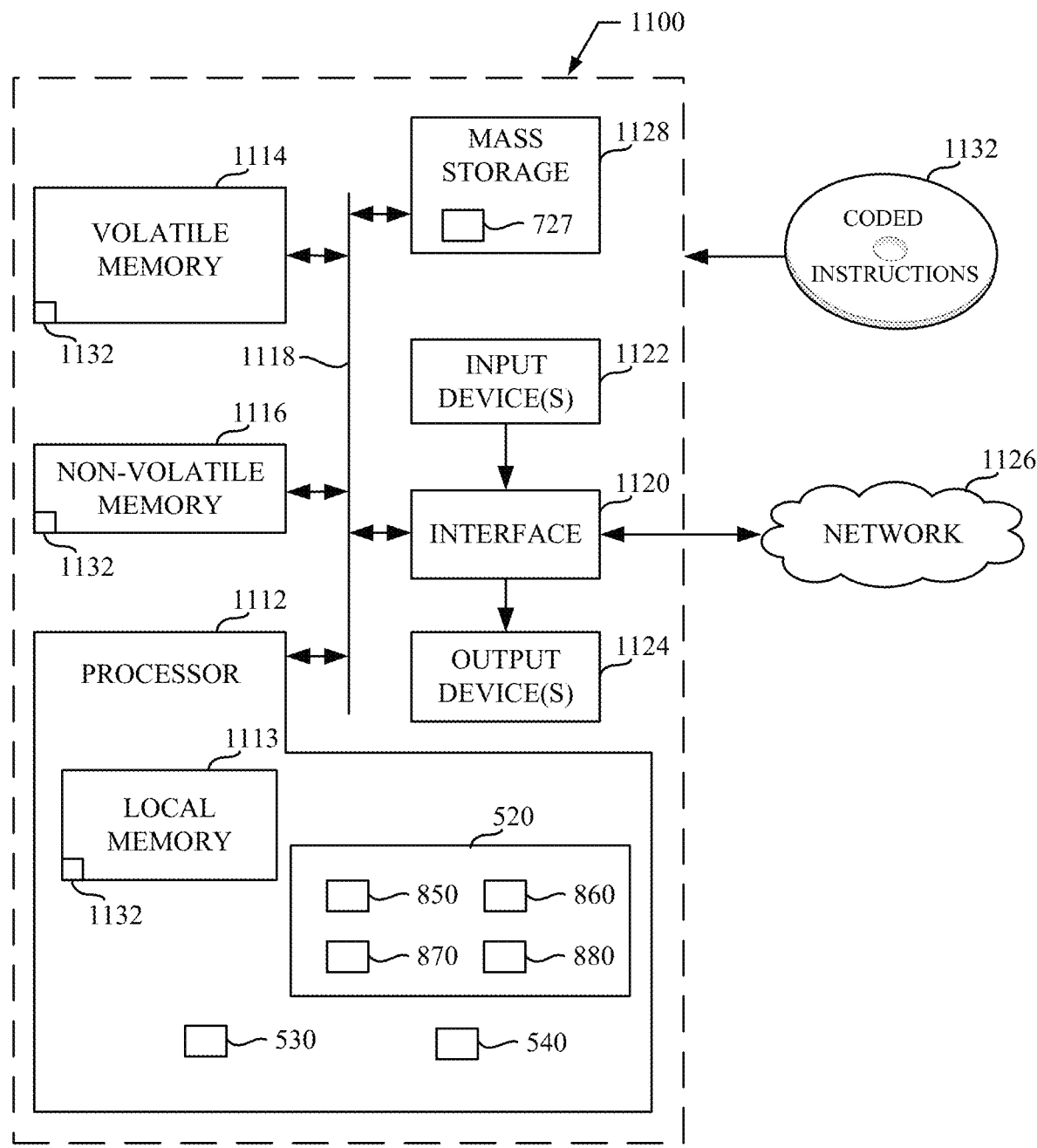
FIG. 11 is a block diagram of an example processor platform structured to execute the instructions of FIGS. 9 and/or 10 to implement the distributed tracing framework of FIGS. 5B and/or 8.

FIG. 11 is a block diagram of an example processor platform 1100 structured to execute the instructions of FIGS. 9-10 to implement the example distributed tracing framework 520 of FIGS. 5B and/or 8. The processor platform 1100 can be, for example, a server, a personal computer, a workstation, a self-learning machine (e.g., a neural network), a mobile device (e.g., a cell phone, a smart phone, a tablet such as an iPad), an Internet appliance, a gaming console, a headset or other wearable device, or other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1112 implements the example distributed tracing framework 520, the example security policy engine 530, and the example DevOps framework 540. The example distributed tracing framework 520 includes the example intermediary generator 850, the example intermediary controller 860, the example trace analyzer 870, and the example remediator 880.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 can be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 can be implemented by flash memory and/or any other desired type of memory device. Access to the main memory 1114, 1116 is controlled by a memory controller.

The processor platform 1100 of the illustrated example also includes an interface circuit 1120. The interface circuit 1120 can be implemented by any type of interface standard, such as an Ethernet interface, a universal serial bus (USB), a Bluetooth® interface, a near field communication (NFC) interface, and/or a PCI express interface. One or more of the example security interface 810, the example control interface 820, the example intermediary interface 830, can the example data store interface 840 can be implemented using the interface circuit 1120.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a micro-phone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip, and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives.

The machine executable instructions 1132 of FIGS. 9-10 can be stored in the mass storage device 1128, in the volatile memory 1114, in the non-volatile memory 1116, and/or on a removable non-transitory computer readable storage medium such as a CD or DVD. The example mass storage device 1128, the volatile memory 1114, and/or the non-volatile memory 1116 can implement the example storage subsystem 560 of FIGS. 5B and/or 8, for example. Alternatively or in addition, the example storage subsystem 560 can be implemented separately and accessible to the processor platform 1100 via the network 1126.

While FIG. 7 illustrates an example edge-cloud environment 700, and FIG. 11 illustrates an example processing platform 1100 on which certain examples can be implemented, certain examples can be implemented in other cloud/edge environments with other processing configurations, etc.

Figure 12:
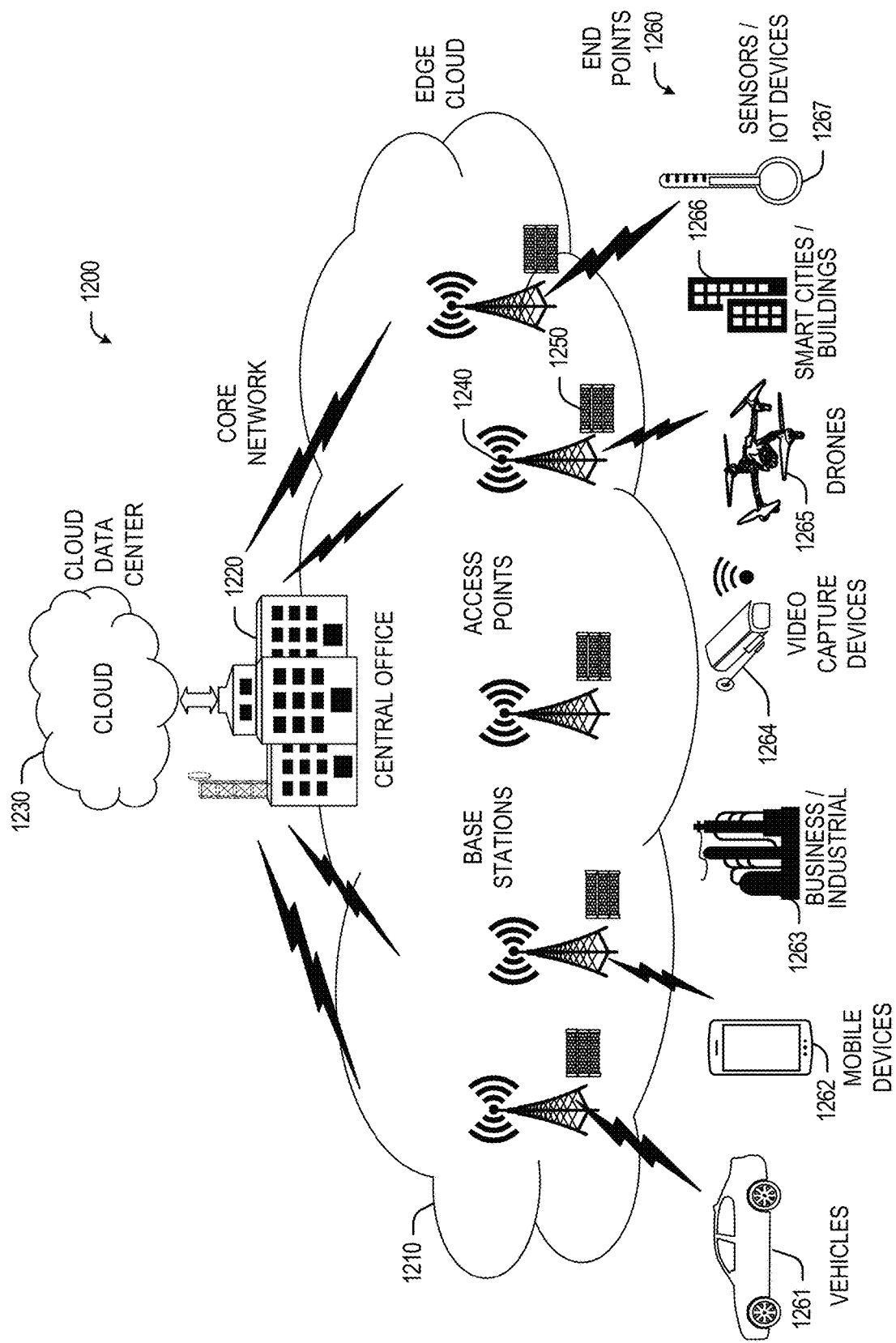
FIG. 12 is a block diagram showing an overview of another edge cloud configuration for edge computing.

FIG. 12 is a block diagram 1200 showing an overview of another configuration for edge computing, which includes a layer of processing referred to in many of the following examples as an "edge cloud". As shown, the edge cloud 1210 is co-located at an edge location, such as an access point or base station 1240, a local processing hub 1250, or a central office 1220, and, thus, may include multiple entities, devices, and equipment instances. The edge cloud 1210 is located much closer to the endpoint (consumer and producer) data sources 1260 (e.g., autonomous vehicles 1261, user equipment 1262, business and industrial equipment 1263, video capture devices 1264, drones 1265, smart cities and building devices 1266, sensors and IoT devices 1267, etc.) than the cloud data center 1230. Compute, memory, and storage resources which are offered at the edges in the edge cloud 1210, are critical to providing ultra-low latency response times for services and functions used by the endpoint data sources 1260 as well as reduce network backhaul traffic from the edge cloud 1210 toward cloud data center 1230, thus improving energy consumption and overall network usage, among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., UEs), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 13:
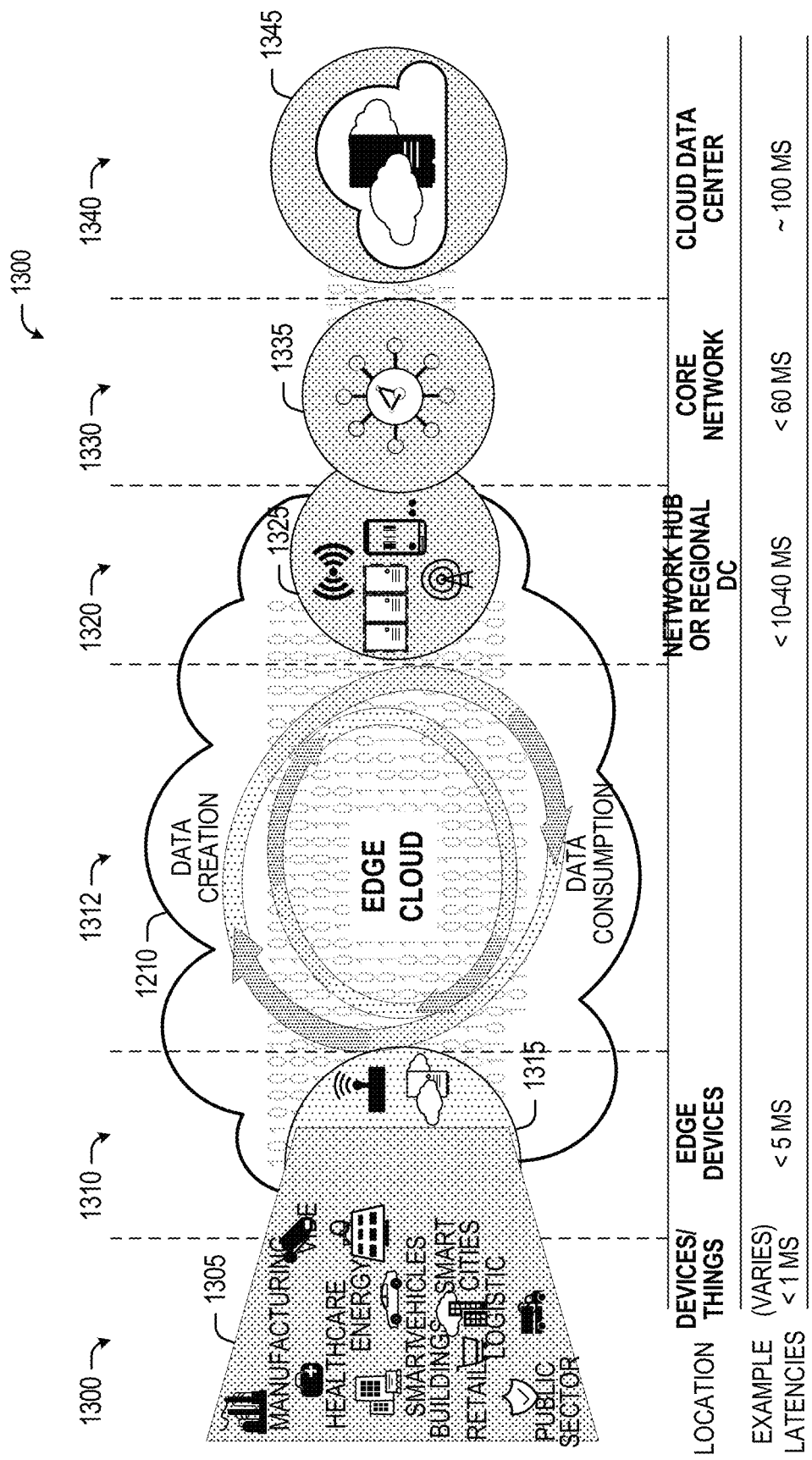
FIG. 13 illustrates operational layers among endpoints, an edge cloud, and cloud computing environments.

FIG. 13 illustrates operational layers among endpoints, an edge cloud, and cloud computing environments. Specifically, FIG. 13 depicts examples of computational use cases 1305, utilizing the edge cloud 1210 among multiple illustrative layers of network computing. The layers begin at an endpoint (devices and things) layer 1300, which accesses the edge cloud 1210 to conduct data creation, analysis, and data consumption activities. The edge cloud 1210 may span multiple network layers, such as an edge devices layer 1310 having gateways, on-premise servers, or network equipment (nodes 1315) located in physically proximate edge systems; a network access layer 1320, encompassing base stations, radio processing units, network hubs, regional data centers, or local network equipment (equipment 1325); and any equipment, devices, or nodes located therebetween (in layer 1312, not illustrated in detail). The network communications within the edge cloud 1210 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 1300, under 5 ms at the edge devices layer 1310, to even between 10 to 40 ms when communicating with nodes at the network access layer 1320. Beyond the edge cloud 1210 are core network 1330 and cloud data center 1340 layers, each with increasing latency (e.g., between 50-60 ms at the core network layer 1330, to 100 or more ms at the cloud data center layer. As a result, operations at a core network data center 1335 or a cloud data center 1345, with latencies of at least 50 to 100 ms or more, will not be able to accomplish many time-critical functions of the use cases 1305. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 1335 or a cloud data center 1345, a central office or content data network may be considered as being located within a "near edge" layer ("near" to the cloud, having high latency values when communicating with the devices and endpoints of the use cases 1305), whereas an access point, base station, on-premise server, or network gateway may be considered as located within a "far edge" layer ("far" from the cloud, having low latency values when communicating with the devices and endpoints of the use cases 1305). It will be understood that other categorizations of a particular network layer as constituting a "close", "local", "near", "middle", or "far" edge may be based on latency, distance, number of network hops, or other measurable characteristics, as measured from a source in any of the network layers 1300-1340.

The various use cases 1305 may access resources under usage pressure from incoming streams, due to multiple services utilizing the edge cloud. To achieve results with low latency, the services executed within the edge cloud 1210 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation and (2) augment other components in the system to resume overall transaction SLA and (3) implement steps to remediate.

Thus, with these variations and service features in mind, edge computing within the edge cloud 1210 may provide the ability to serve and respond to multiple applications of the use cases 1305 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.) which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required because edge locations may be unmanned and may even need permissioned access (e.g., when housed in a third-party location). Such issues are magnified in the edge cloud 1210 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 1210 (network layers 1300-1340), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 1210.

As such, the edge cloud 1210 is formed from network components and functional features operated by and within edge gateway nodes, edge aggregation nodes, or other edge compute nodes among network layers 1310-1330. The edge cloud 1210 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serves as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 1210 may be servers, multi-tenant servers, appliance computing devices, and/or any other type of computing devices. For example, the edge cloud 1210 may include an appliance computing device that is a self-contained electronic device including a housing, a chassis, a case, or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but that may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 18B. The edge cloud 1210 may also include one or more server and/or one or more multi-tenant server. Such a server may include an operating system and a virtual computing environment. A virtual computing environment may include a hypervisor managing (spawning, deploying, destroying, etc.) ne or more virtual machines, one or more containers, etc. Such virtual computing environments provide an execution environment in which one or more applications and/or other software, code, or scripts may execute while being isolated from one or more other applications, software, code, or scripts.

Figure 14:
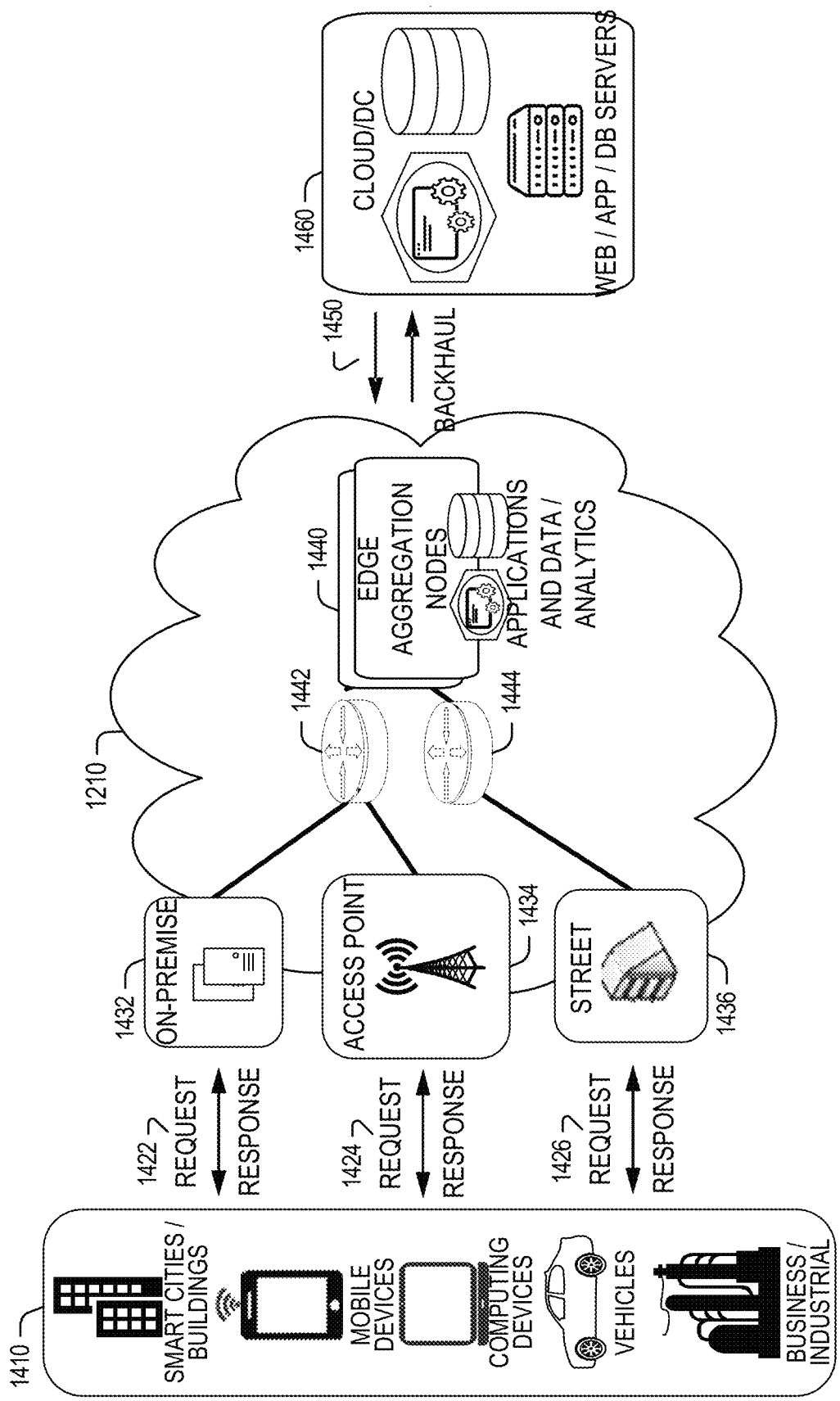
FIG. 14 a block diagram of an example environment for networking and services in an edge computing system.

FIG. 14 illustrates a block diagram of an example environment 300 in which, various client endpoints 1410 (in the form of mobile devices, computers, autonomous vehicles, business computing equipment, industrial processing equipment) exchange requests and responses with the example edge cloud 110. For instance, computers, business computing equipment, and industrial processing equipment may obtain network access via a wired broadband network, by exchanging requests and responses 1422 through an on-premise network system 1432. Mobile computing devices may obtain network access via a wireless broadband network, by exchanging requests and responses 1424 through a cellular network tower 1434. Autonomous vehicles may obtain network access for requests and responses 1426 via a wireless vehicular network through a street-located network system 1436. However, regardless of the type of network access, the TSP may deploy aggregation points 1442, 1444 within the edge cloud 1210 to aggregate traffic and requests. Thus, within the edge cloud 1210, the TSP may deploy various compute and storage resources, such as at edge aggregation nodes 1440, to provide requested content. The edge aggregation nodes 1440 and other systems of the edge cloud 1210 are connected to a cloud or data center 1460, which uses a backhaul network 1450 to fulfill higher-latency requests from a cloud/data center for websites, applications, database servers, etc. (Additional or consolidated instances of the edge aggregation nodes 1440 and the aggregation points 1442, 1444, including those deployed on a single server framework, may also be present within the edge cloud 1210 or other areas of the TSP infrastructure).

Figure 15:
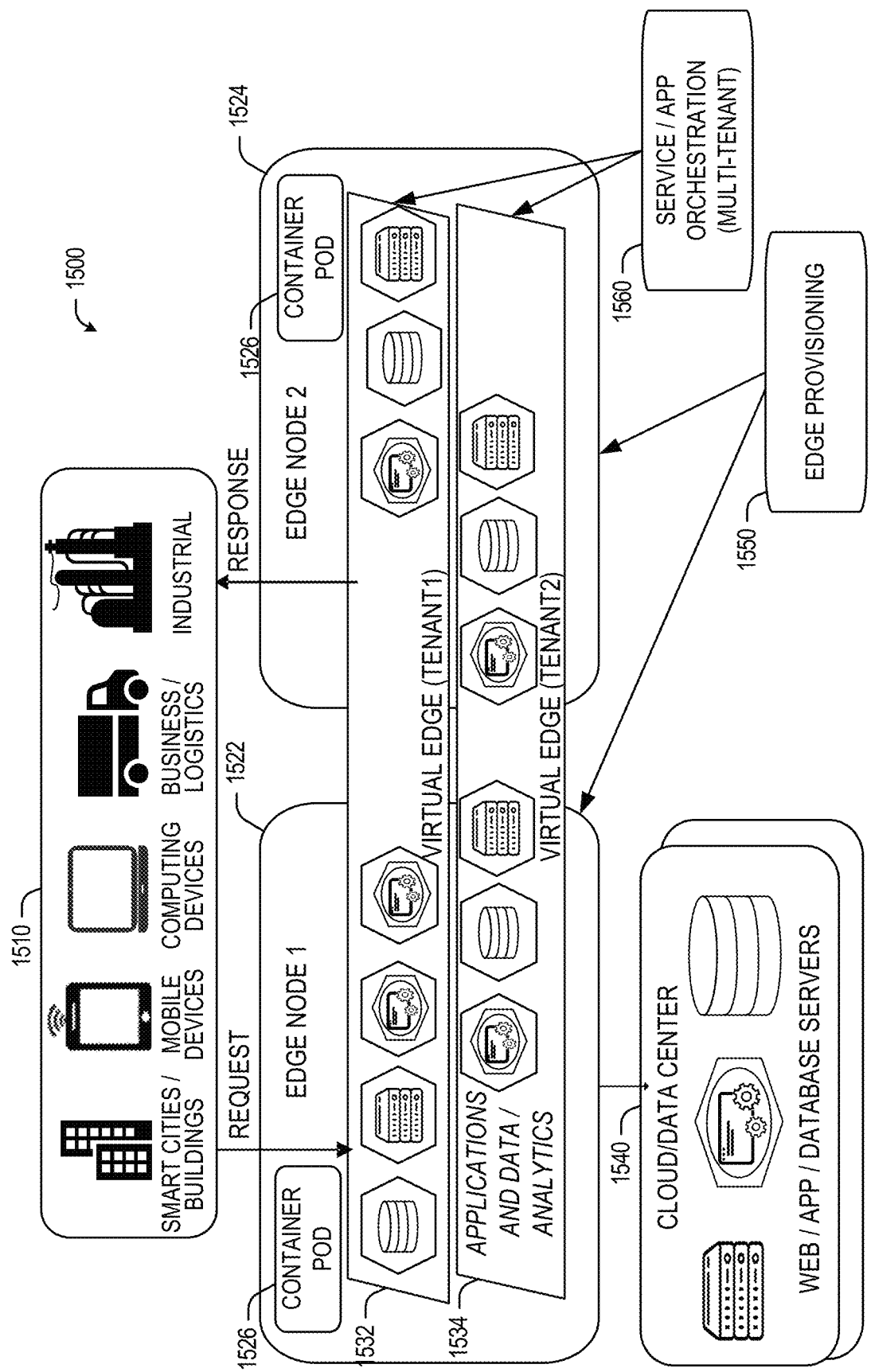
FIG. 15 illustrates deployment of a virtual edge configuration in an edge computing system operated among multiple edge nodes and multiple tenants.

FIG. 15 illustrates deployment and orchestration for virtual edge configurations across an edge computing system operated among multiple edge nodes and multiple tenants. Specifically, FIG. 15 depicts coordination of a first edge node 1522 and a second edge node 1524 in an edge computing system 1500, to fulfill requests and responses for various client endpoints 1510 (e.g., smart cities/building systems, mobile devices, computing devices, business/logistics systems, industrial systems, etc.) which access various virtual edge instances. Here, the virtual edge instances provide edge compute capabilities and processing in an edge cloud, with access to a cloud/data center 1540 for higher-latency requests for websites, applications, database servers, etc. However, the edge cloud enables coordination of processing among multiple edge nodes for multiple tenants or entities.

In the example of FIG. 15, these virtual edge instances include: a first virtual edge 1532, offered to a first tenant (Tenant 1), which offers a first combination of edge storage, computing, and services; and a second virtual edge 1534, offering a second combination of edge storage, computing, and services. The virtual edge instances 1532, 1534 are distributed among the edge nodes 1522, 1524, and may include scenarios in which a request and response are fulfilled from the same or different edge nodes. The configuration of the edge nodes 1522, 1524 to operate in a distributed yet coordinated fashion occurs based on edge provisioning functions 1550. The functionality of the edge nodes 1522, 1524 to provide coordinated operation for applications and services, among multiple tenants, occurs based on orchestration functions 1560.

It should be understood that some of the devices 1510 are multi-tenant devices where Tenant 1 may function within a tenant1 'slice' while a Tenant 2 may function within a tenant2 'slice' (and, in further examples, additional or sub-tenants may exist; and each tenant may even be specifically entitled and transactionally tied to a specific set of features all the way day to specific hardware features). A trusted multi-tenant device may further contain a tenant-specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 1522, 1524 may operate as security feature enforcement points for local resources allocated to multiple tenants per node. Additionally, tenant runtime and application execution (e.g., in instances 1532, 1534) may serve as an enforcement point for a security feature that creates a virtual edge abstraction of resources spanning potentially multiple physical hosting platforms. Finally, the orchestration functions 1560 at an orchestration entity may operate as a security feature enforcement point for marshalling resources along tenant boundaries.

Edge computing nodes may partition resources (memory, CPU, GPU, interrupt controller, I/O controller, memory controller, bus controller, etc.) where respective partitionings may contain a RoT capability and where fan-out and layering according to a DICE model may further be applied to Edge Nodes. Cloud computing nodes consisting of containers, FaaS engines, Servlets, servers, or other computation abstraction may be partitioned according to a DICE layering and fan-out structure to support a RoT context for each. Accordingly, the respective devices 1510, 1522, and 1540 spanning RoTs may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 15. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each of the edge nodes 1522, 1524 may implement the use of containers, such as with the use of a container "pod" 1526, 1528 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 1532, 1534 are partitioned according to the needs of each container.

With the use of container pods, a pod controller oversees the partitioning and allocation of containers and resources. The pod controller receives instructions from an orchestrator (e.g., the orchestrator 1560) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller.

For instance, the orchestrator 1560 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 16:
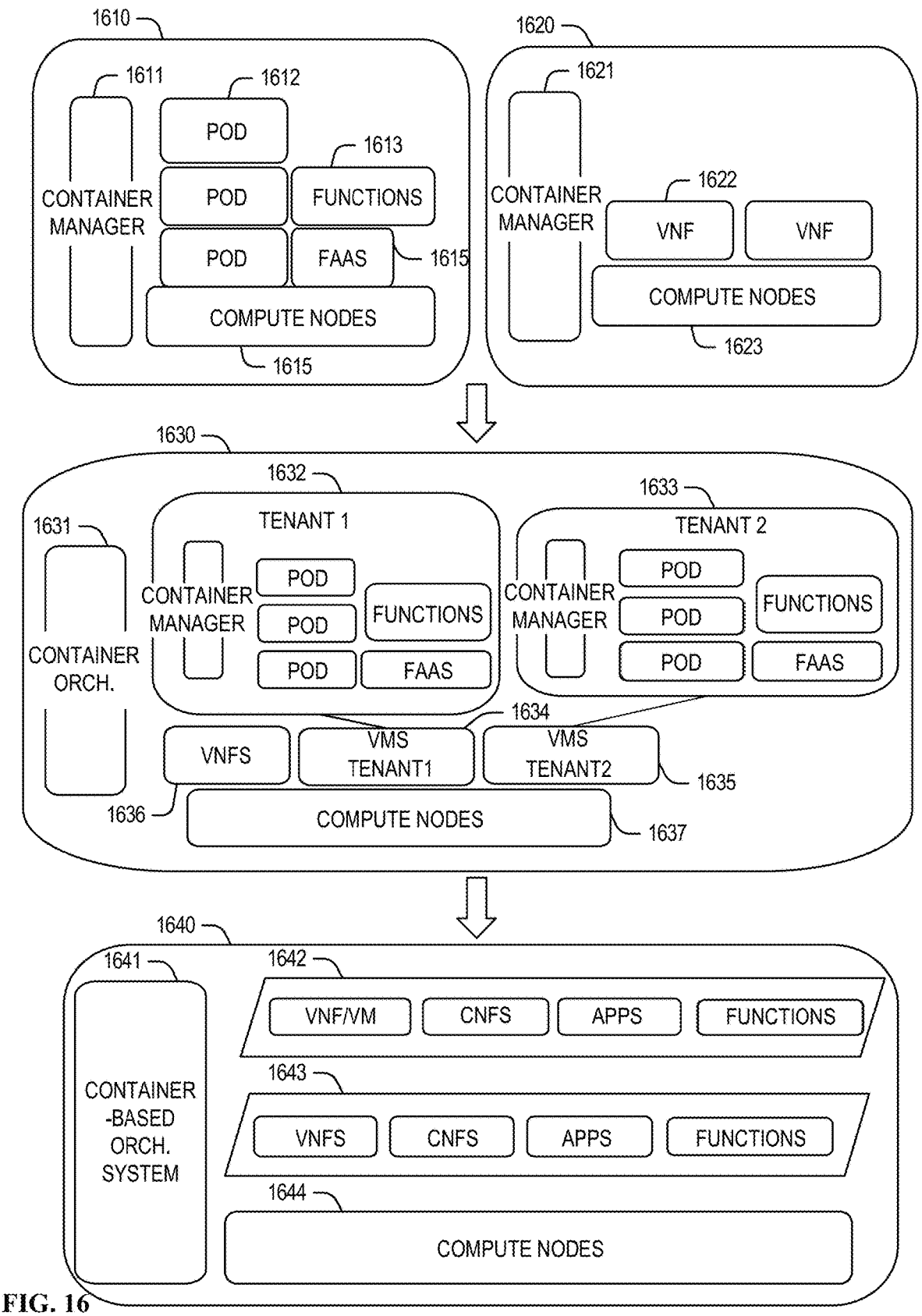
FIG. 16 illustrates additional compute arrangements deploying containers in an edge computing system.

FIG. 16 illustrates additional compute arrangements deploying containers in an edge computing system. As a simplified example, system arrangements 1610, 1620 depict settings in which a pod controller (e.g., container managers 1611, 1621, and a container orchestrator 1631) is adapted to launch containerized pods, functions, and functions-as-a-service instances through execution via compute nodes (1615 in arrangement 1610), or to separately execute containerized virtualized network functions through execution via compute nodes (1623 in arrangement 1620). This arrangement is adapted for use of multiple tenants in an example system arrangement 1630 (using compute nodes 1637), where containerized pods (e.g., pods 1612), functions (e.g., functions 1613, VNFs 1622, 1636), and functions-as-a-service instances (e.g., FaaS instance 1615) are launched within virtual machines (e.g., VMs 1634, 1635 for tenants 1632, 1633) specific to respective tenants (aside the execution of virtualized network functions). This arrangement is further adapted for use in system arrangement 1640, which provides containers 1642, 1643, or execution of the various functions, applications, and functions on compute nodes 1644, as coordinated by a container-based orchestration system 1641.

The system arrangements of depicted in FIG. 16 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 16, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves, and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 17:
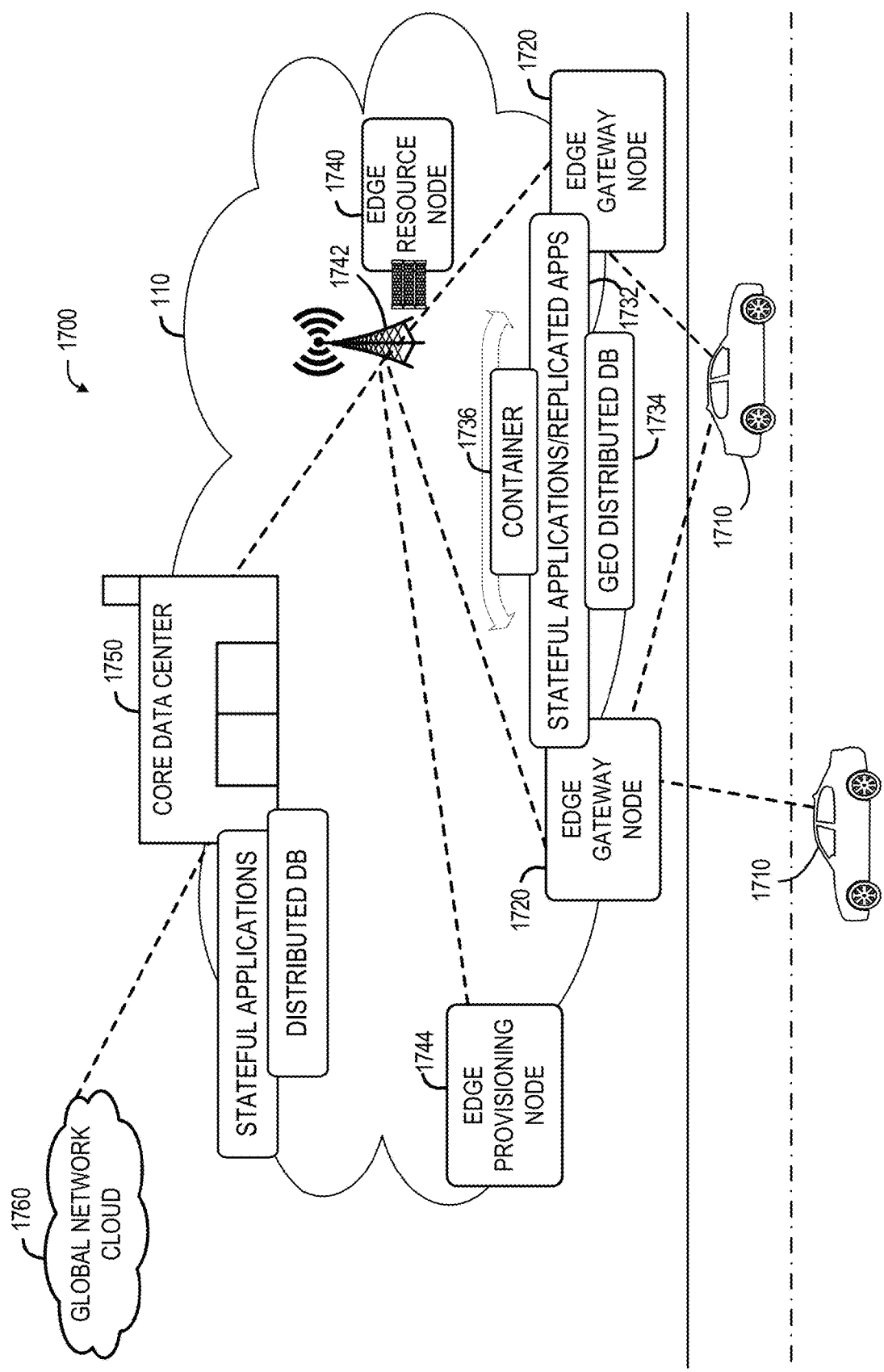
FIG. 17 illustrates an example compute and communication use case involving mobile access to applications in an example edge computing system.

It should be appreciated that the edge computing systems and arrangements discussed herein may be applicable in various solutions, services, and/or use cases involving mobility. As an example, FIG. 17 shows an example simplified vehicle compute and communication use case involving mobile access to applications in an example edge computing system 1700 that implements an edge cloud such as the edge cloud 1210 of FIG. 12. In this use case, respective client compute nodes 1710 may be embodied as in-vehicle compute systems (e.g., in-vehicle navigation and/or infotainment systems) located in corresponding vehicles which communicate with the example edge gateway nodes 1720 during traversal of a roadway. For instance, the edge gateway nodes 1720 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 1710 and a particular one of the edge gateway nodes 1720 may propagate so as to maintain a consistent connection and context for the example client compute node 1710. Likewise, mobile edge nodes may aggregate at the high priority services or according to the throughput or latency resolution requirements for the underlying service(s) (e.g., in the case of drones). The respective edge gateway nodes 1720 include an amount of processing and storage capabilities and, as such, some processing and/or storage of data for the client compute nodes 1710 may be performed on one or more of the edge gateway nodes 1720.

The edge gateway nodes 1720 may communicate with one or more edge resource nodes 1740, which are illustratively embodied as compute servers, appliances or components located at or in a communication base station 1742 (e.g., a based station of a cellular network). As discussed above, the respective edge resource node(s) 1740 include an amount of processing and storage capabilities and, as such, some processing and/or storage of data for the client compute nodes 1710 may be performed on the edge resource node(s) 1740. For example, the processing of data that is less urgent or important may be performed by the edge resource node(s) 1740, while the processing of data that is of a higher urgency or importance may be performed by the edge gateway devices 1720 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 1740 also communicate with the core data center 1750, which may include compute servers, appliances, and/or other components located in a central location (e.g., a central office of a cellular communication network). The example core data center 1750 provides a gateway to the global network cloud 1760 (e.g., the Internet) for the edge cloud 1210 operations formed by the edge resource node(s) 1740 and the edge gateway devices 1720. Additionally, in some examples, the core data center 1750 may include an amount of processing and storage capabilities and, as such, some processing and/or storage of data for the client compute devices may be performed on the core data center 1750 (e.g., processing of low urgency or importance, or high complexity).

The edge gateway nodes 1720 or the edge resource node(s) 1740 may offer the use of stateful applications 1732 and a geographic distributed database 1734. Although the applications 1732 and database 1734 are illustrated as being horizontally distributed at a layer of the edge cloud, it will be understood that resources, services, or other components of the application may be vertically distributed throughout the edge cloud (including, part of the application executed at the client compute node 1710, other parts at the edge gateway nodes 1720 or the edge resource node(s) 1740, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 1736 (or pod of containers) may be flexibly migrated from one of the edge nodes 1720 to other edge nodes (e.g., another one of edge nodes 1720, one of the edge resource node(s) 1740, etc.) such that the container with an application and workload does not need to be reconstituted, re-compiled, re-interpreted in order for migration to work. However, in such settings, there may be some remedial or "swizzling" translation operations applied. For example, the physical hardware at the edge resource node(s) 1740 may differ from the hardware at the edge gateway nodes 1720 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format or may involve mapping interfaces and operations. A pod controller may be used to drive the interface mapping as part of the container lifecycle, which includes migration to/from different hardware environments.

The scenarios encompassed by FIG. 17 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 1720, some others at the edge resource node(s) 1740, and others in the core data center 1750 or global network cloud 1760.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 1700 can include or be in communication with an edge provisioning node 1744. The edge provisioning node 1744 can distribute software such as the example computer readable instructions 1882 of FIG. 8B, to various receiving parties for implementing any of the methods described herein. The example edge provisioning node 1744 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 1744 may be located in a cloud, in a local area network, in an edge network, in a wide area network, on the Internet, and/or any other location communicatively coupled with the receiving party(-ies). The receiving parties may be customers, clients, associates, users, etc. of the entity owning and/or operating the edge provisioning node 1744. For example, the entity that owns and/or operates the edge provisioning node 1744 may be a developer, a seller, and/or a licensor (or a customer and/or consumer thereof) of software instructions such as the example computer readable instructions 1882 of FIG. 18B. The receiving parties may be consumers, service providers, users, retailers, OEMs, etc., who purchase and/or license the software instructions for use and/or re-sale and/or sub-licensing.

In an example, edge provisioning node 1744 includes one or more servers and one or more storage devices. The storage devices host computer readable instructions such as the example computer readable instructions 1882 of FIG. 18B, as described below. Similarly to edge gateway devices 1720 described above, the one or more servers of the edge provisioning node 1744 are in communication with a base station 1742 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third party payment entity.

The servers enable purchasers and/or licensors to download the computer readable instructions 1882 from the edge provisioning node 1744. For example, the software instructions, which may correspond to the example computer readable instructions 1882 of FIG. 18B, may be downloaded to the example processor platform/s, which is to execute the computer readable instructions 1882 to implement the methods described herein.

In some examples, the processor platform(s) that execute the computer readable instructions 1882 can be physically located in different geographic locations, legal jurisdictions, etc. In some examples, one or more servers of the edge provisioning node 1744 periodically offer, transmit, and/or force updates to the software instructions (e.g., the example computer readable instructions 1882 of FIG. 18B) to ensure improvements, patches, updates, etc. are distributed and applied to the software instructions implemented at the end user devices. In some examples, different components of the computer readable instructions 1882 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

In further examples, any of the compute nodes or devices discussed with reference to the present edge computing systems and environment may be fulfilled based on the components depicted in FIGS. 18A and 18B. Respective edge compute nodes may be embodied as a type of device, appliance, computer, or other "thing" capable of communicating with other edge, networking, or endpoint components. For example, an edge compute device may be embodied as a personal computer, a server, a smartphone, a mobile compute device, a smart appliance, an in-vehicle compute system (e.g., a navigation system), a self-contained device having an outer case, shell, etc., or other device or system capable of performing the described functions.

Figure 18A:
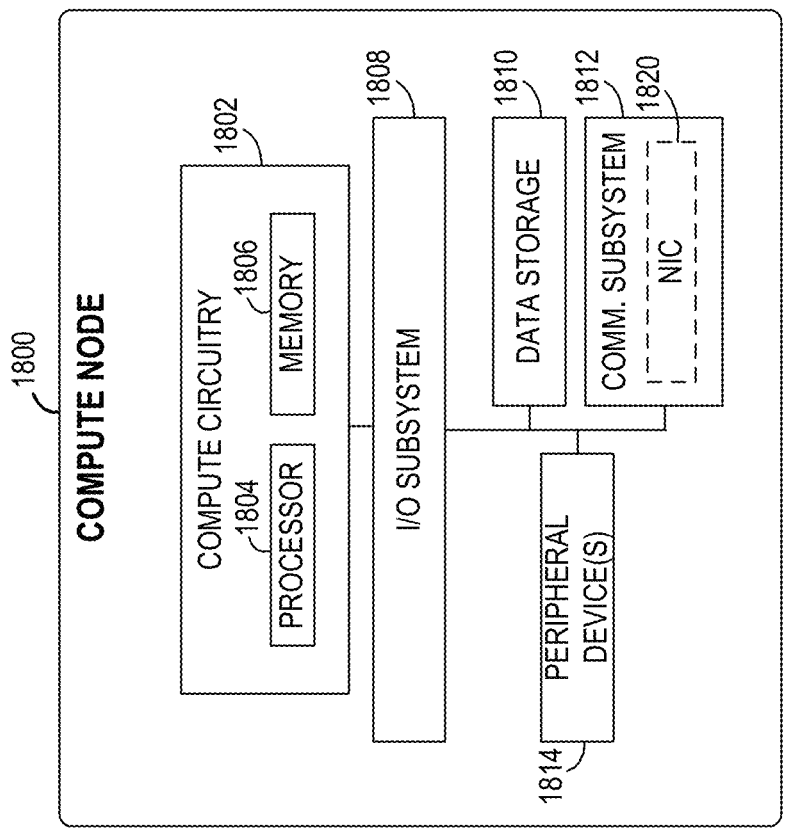
FIG. 18A is a block diagram of an example implementation of an example compute node that may be deployed in one of the edge computing systems illustrated in FIGS. 12-15 and/or 17.

FIG. 18A is a block diagram of an example implementation of an example edge compute node 1800 that includes a compute engine (also referred to herein as "compute circuitry") 1802, an input/output (I/O) subsystem 1808, data storage 1810, a communication circuitry subsystem 1812, and, optionally, one or more peripheral devices 1814. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component. The example edge compute node 1800 of FIG. 18A may be deployed in one of the edge computing systems illustrated in FIGS. 7, 12-15, and/or 17 and/or to implement any edge computing node of FIGS. 7, 12-15, and/or 17.

The compute node 1800 may be embodied as any type of engine, device, or collection of devices capable of performing various compute functions. In some examples, the compute node 1800 may be embodied as a single device such as an integrated circuit, an embedded system, a field-programmable gate array (FPGA), a system-on-a-chip (SOC), or other integrated system or device. In the illustrative example, the compute node 1800 includes or is embodied as a processor 1804 and a memory 1806. The processor 1804 may be embodied as any type of processor capable of performing the functions described herein (e.g., executing an application). For example, the processor 1804 may be embodied as a multi-core processor(s), a microcontroller, a processing unit, a specialized or special purpose processing unit, or other processor or processing/controlling circuit. In some examples, the processor 1804 may be embodied as, include, or be coupled to an FPGA, an application specific integrated circuit (ASIC), reconfigurable hardware or hardware circuitry, or other specialized hardware to facilitate performance of the functions described herein. Also, in some examples, the processor 1804 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 1804 may work in coordination with each other to execute many types of operations and instructions within and on behalf of the compute node 1800.

The main memory 1806 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may include a transistor-less stackable cross point architecture in which memory cells sit at the intersection of word lines and bit lines and are individually addressable and in which bit storage is based on a change in bulk resistance. In some examples, all or a portion of the main memory 1806 may be integrated into the processor 1804. The main memory 1806 may store various software and data used during operation such as one or more applications, data operated on by the application(s), libraries, and drivers.

The compute circuitry 1802 is communicatively coupled to other components of the compute node 1800 via the I/O subsystem 1808, which may be embodied as circuitry and/or components to facilitate input/output operations with the compute circuitry 1802 (e.g., with the processor 1804 and/or the main memory 1806) and other components of the compute circuitry 1802. For example, the I/O subsystem 1808 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1808 may form a portion of a system-on-a-chip (SoC) and be incorporated, along with one or more of the processor 1804, the main memory 1806, and other components of the compute circuitry 1802, into the compute circuitry 1802.

The one or more illustrative data storage devices 1810 may be embodied as any type of devices configured for short-term or long-term storage of data such as, for example, memory devices and circuits, memory cards, hard disk drives, solid-state drives, or other data storage devices. Individual data storage devices 1810 may include a system partition that stores data and firmware code for the data storage device 1810. Individual data storage devices 1810 may also include one or more operating system partitions that store data files and executables for operating systems depending on, for example, the type of compute node 1800.

The communication circuitry 1812 may be embodied as any communication circuit, device, or collection thereof, capable of enabling communications over a network between the compute circuitry 1802 and another compute device (e.g., an edge gateway of an implementing edge computing system). The communication circuitry 1812 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1812 includes a network interface controller (NIC) 1820, which may also be referred to as a host fabric interface (HFI). The NIC 1820 may be embodied as one or more add-in-boards, daughter cards, network interface cards, controller chips, chipsets, or other devices that may be used by the compute node 1800 to connect with another compute device (e.g., an edge gateway node). In some examples, the NIC 1820 may be embodied as part of a system-on-a-chip (SoC) that includes one or more processors or included on a multichip package that also contains one or more processors. In some examples, the NIC 1820 may include a local processor (not shown) and/or a local memory (not shown) that are both local to the NIC 1820. In such examples, the local processor of the NIC 1820 may be capable of performing one or more of the functions of the compute circuitry 1802 described herein. Additionally, or alternatively, in such examples, the local memory of the NIC 1820 may be integrated into one or more components of the client compute node at the board level, socket level, chip level, and/or other levels.

Additionally, in some examples, a respective compute node 1800 may include one or more peripheral devices 1814. Such peripheral devices 1814 may include any type of peripheral device found in a compute device or server such as audio input devices, a display, other input/output devices, interface devices, and/or other peripheral devices, depending on the particular type of the compute node 1800. In further examples, the compute node 1800 may be embodied by a respective edge compute node (whether a client, gateway, or aggregation node) in an edge computing system or like forms of appliances, computers, subsystems, circuitry, or other components.

Figure 18B:
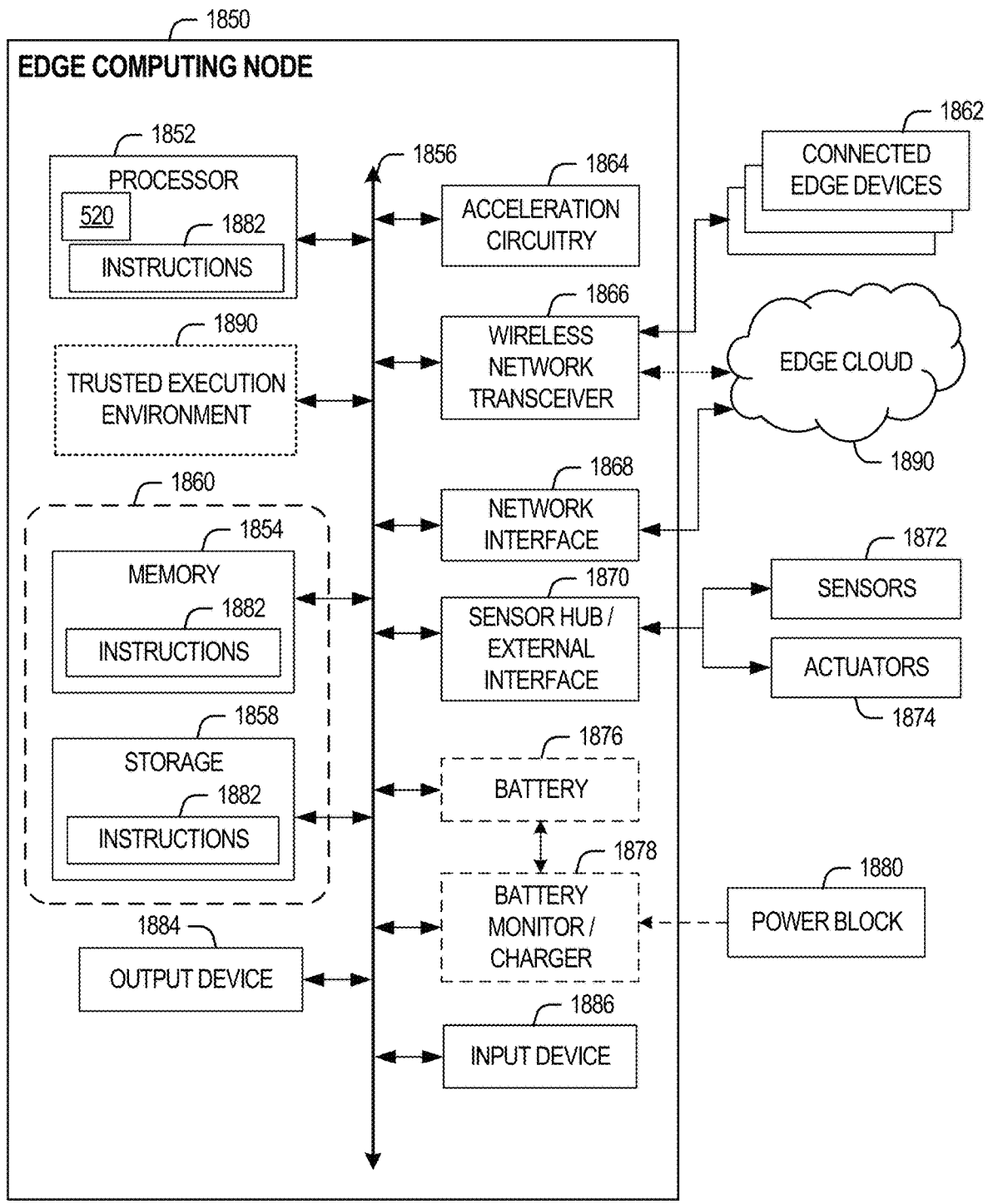
FIG. 18B is another block diagram of an example implementation of an example compute node that may be deployed in one of the edge computing systems illustrated in FIGS. 12-15 and/or 17.

In a more detailed example, FIG. 18B illustrates a block diagram of an example edge computing node 1850 structured to execute the instructions of FIGS. 9-10 to implement the techniques (e.g., operations, processes, methods, and methodologies) described herein, such as the apparatus 520 of FIG. 8. This edge computing node 1850 provides a closer view of the respective components of node 1800 when implemented as or as part of a computing device (e.g., as a mobile device, a base station, server, gateway, etc.). The edge computing node 1850 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the edge computing node 1850, or as components otherwise incorporated within a chassis of a larger system. For example, the edge computing node 1850 can be a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, an Internet of Things (IoT) device, or any other type of computing device.

The edge computing device 1850 may include processing circuitry in the form of a processor 1852, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1852 may be a part of a system on a chip (SoC) in which the processor 1852 and other components are formed into a single integrated circuit, or a single package, such as the Edison™ or Galileo™ SoC boards from Intel Corporation, Santa Clara, California. As an example, the processor 1852 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 1852 and accompanying circuitry may be provided in a single socket form factor, multiple socket form factor, or a variety of other formats, including in limited hardware configurations or configurations that include fewer than all elements shown in FIG. 18. In this example, the processor 1852 implements the distributed tracing framework 520.

The processor 1852 may communicate with a system memory 1854 over an interconnect 1856 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1858 may also couple to the processor 1852 via the interconnect 1856. In an example, the storage 1858 may be implemented via a solid-state disk drive (SSDD). Other devices that may be used for the storage 1858 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1858 may be on-die memory or registers associated with the processor 1852. However, in some examples, the storage 1858 may be implemented using a micro hard disk drive (HDD). Further, any number of new technologies may be used for the storage 1858 in addition to, or instead of, the technologies described, such resistance change memories, phase change memories, holographic memories, or chemical memories, among others.

The components may communicate over the interconnect 1856. The interconnect 1856 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1856 may be a proprietary bus, for example, used in an SoC based system. Other bus systems may be included, such as an I2C interface, an SPI interface, point to point interfaces, and a power bus, among others.

The interconnect 1856 may couple the processor 1852 to a transceiver 1866, for communications with the connected edge devices 1862. The transceiver 1866 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1862. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1866 (or multiple transceivers) may communicate using multiple standards or radios for communications at a different range. For example, the edge computing node 1850 may communicate with close devices, e.g., within about 10 meters, using a local transceiver based on BLE, or another low power radio, to save power. More distant connected edge devices 1862, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1866 (e.g., a radio transceiver) may be included to communicate with devices or services in the edge cloud 1890 via local or wide area network protocols. The wireless network transceiver 1866 may be an LPWA transceiver that follows the IEEE 802.15.4, or IEEE 802.15.4g standards, among others. The edge computing node 1850 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1866, as described herein. For example, the transceiver 1866 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1866 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1868 may be included to provide a wired communication to nodes of the edge cloud 1890 or to other devices, such as the connected edge devices 1862 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1868 may be included to enable connecting to a second network, for example, a first NIC 1868 providing communications to the cloud over Ethernet, and a second NIC 1868 providing communications to other devices over another type of network.

Given the variety of types of applicable communications from the device to another component or network, applicable communications circuitry used by the device may include or be embodied by any one or more of components 1864, 1866, 1868, or 1870. Accordingly, in various examples, applicable means for communicating (e.g., receiving, transmitting, etc.) may be embodied by such communications circuitry.

The edge computing node 1850 may include or be coupled to acceleration circuitry 1864, which may be embodied by one or more AI accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 1856 may couple the processor 1852 to a sensor hub or external interface 1870 that is used to connect additional devices or subsystems. The devices may include sensors 1872, such as accelerometers, level sensors, flow sensors, optical light sensors, camera sensors, temperature sensors, global navigation system (e.g., GPS) sensors, pressure sensors, barometric pressure sensors, and the like. The hub or interface 1870 further may be used to connect the edge computing node 1850 to actuators 1874, such as power switches, valve actuators, an audible sound generator, a visual warning device, and the like.

In some optional examples, various input/output (I/O) devices may be present within or connected to, the edge computing node 1850. For example, a display or other output device 1884 may be included to show information, such as sensor readings or actuator position. An input device 1886, such as a touch screen or keypad may be included to accept input. An output device 1884 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 1850. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1876 may power the edge computing node 1850, although, in examples in which the edge computing node 1850 is mounted in a fixed location, it may have a power supply coupled to an electrical grid, or the battery may be used as a backup or for temporary capabilities. The battery 1876 may be a lithium ion battery, or a metal-air battery, such as a zinc-air battery, an aluminum-air battery, a lithium-air battery, and the like.

A battery monitor/charger 1878 may be included in the edge computing node 1850 to track the state of charge (SoCh) of the battery 1876, if included. The battery monitor/charger 1878 may be used to monitor other parameters of the battery 1876 to provide failure predictions, such as the state of health (SoH) and the state of function (SoF) of the battery 1876. The battery monitor/charger 1878 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1878 may communicate the information on the battery 1876 to the processor 1852 over the interconnect 1856. The battery monitor/charger 1878 may also include an analog-to-digital (ADC) converter that enables the processor 1852 to directly monitor the voltage of the battery 1876 or the current flow from the battery 1876. The battery parameters may be used to determine actions that the edge computing node 1850 may perform, such as transmission frequency, mesh network operation, sensing frequency, and the like.

A power block 1880, or other power supply coupled to a grid, may be coupled with the battery monitor/charger 1878 to charge the battery 1876. In some examples, the power block 1880 may be replaced with a wireless power receiver to obtain the power wirelessly, for example, through a loop antenna in the edge computing node 1850. A wireless battery charging circuit, such as an LTC4020 chip from Linear Technologies of Milpitas, California, among others, may be included in the battery monitor/charger 1878. The specific charging circuits may be selected based on the size of the battery 1876, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1858 may include instructions 1882 in the form of software, firmware, or hardware commands to implement the techniques described herein. Although such instructions 1882 are shown as code blocks included in the memory 1854 and the storage 1858, it may be understood that any of the code blocks may be replaced with hardwired circuits, for example, built into an application specific integrated circuit (ASIC).

In an example, the instructions 1882 provided via the memory 1854, the storage 1858, or the processor 1852 may be embodied as a non-transitory, machine-readable medium 1860 including code to direct the processor 1852 to perform electronic operations in the edge computing node 1850. The processor 1852 may access the non-transitory, machine-readable medium 1860 over the interconnect 1856. For instance, the non-transitory, machine-readable medium 1860 may be embodied by devices described for the storage 1858 or may include specific storage units such as optical disks, flash drives, or any number of other hardware devices. The non-transitory, machine-readable medium 1860 may include instructions to direct the processor 1852 to perform a specific sequence or flow of actions, for example, as described with respect to the flowchart(s) and block diagram (s) of operations and functionality depicted above. As used herein, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

The machine executable instructions 900 of FIGS. 9-10 may be stored in memory 1852 and/or storage 1858 such as a mass storage device, in volatile memory, in non-volatile memory, and/or on a removable non-transitory computer readable storage medium such as a CD or DVD.

From the foregoing, it will be appreciated that example methods, apparatus and articles of manufacture have been disclosed that enable dynamic, interactive monitoring and adjustment of applications, processes, and other services across a network infrastructure using a distributed tracing framework driven by intermediaries and controlled across device, construct, and privilege boundaries via an edge computing platform. The disclosed methods, apparatus and articles of manufacture improve the efficiency of using a computing device by enabling efficient, effective monitoring and debugging across a distributed system at the cloud, edge, and endpoint device levels. The disclosed methods, apparatus and articles of manufacture are accordingly directed to one or more improvement(s) in the functioning of a computer.

Further, tracing and associated application and/or service debugging is expensive and problematic when trying to deploy across a distributed system. Collecting information and implementing control across multiple systems can be difficult, if not impossible, given the presence of multiple entities and associated rules. Additionally, the rapid growth of edge presents a challenge and opportunity for software engineering practices at scale. Debugging, A/B testing, correlating anomalies, ruling out factors as causes of bugs and failures, and/or establishing patterns among faults and failures are all complicated across large numbers of independently developed microservices that work in concert to deliver end-user value. These problems are further complicated at the edge where the infrastructure is heterogeneous, different systems are maintained in different locations and subject to different failure profiles, and timing anomalies are more likely to occur due to non-uniform communication, non-localized placements, and other obfuscating factors such as power-constrained and bandwidth-constrained distribution of tasks. Adding to these complications is the problem that different edge locations may belong to different trust boundaries, and, thus, a chain of actions that spans many different microservices in loosely-coupled interactions may also be transparent, semi-transparent, or opaque, as one tries to correlate various data and statistics in order to trace execution, collect debugging information, etc.

As described and disclosed herein, dynamic tracing control is not linked to containers or other virtual memory constructs but is instead correlated to end-to-end connections in a service mesh. Tracing, event logging, resource monitoring, etc., can be facilitated via the tracing framework, which collects information across a system.

Certain examples provide tracing proxies, verification proxies, and trace and verification control intermediaries that provide a tappable infrastructure for monitoring of events of interest and for automating verification, while reducing or minimizing intrusion on performance and software development practices. As such, certain examples keep an amount of overhead small on production software and reduce/minimize and amount of debugging, tracing, and/or logging code used to zoom in on a problem that may arise during or after production deployments. Dynamic tracing control provides a flexible, entity-independent infrastructure for monitoring events of interest and improving application and/or service development and execution.

Certain examples provide secure (e.g., signed), timed markers identifying tracer points where tracing is performed, and corresponding trace data is collected and associated with the secure, timed markers. The secure timed markers, together with end to end flow identifiers, provide context for traced information, which can be aggregated, summarized, formed into trace point graphs, etc. Certain examples provide debugging and trace brokering with middleware that securely and time-accurately bridges between a higher level trace and a lower level trace through tracing and verification intermediaries.

Certain examples provide autonomous tracing with automatic trace data recycling, virtual single-stepping through code, distributed tracing callbacks, etc. Verification such as hashers, stop watches, etc., can be provided to authentic intermediaries, traces, remedial actions, etc. In certain examples, tracing is provided with software wrappers provided per computational device (smart NIC, smart disk, etc.) to propagate a marker in device-dependent fashion. While certain examples facilitate debugging, tracing, etc., in an instruction stream inside an application running on a processor, examples can be applied to other logic implemented in other forms of computational resources such as smart network interface cards (NICs), computable storage, graphics processing units (GPUs), etc., which can expose tracing points and be used to collect traces. In certain examples, trace, analysis, and remediation results can be stored and propagated (e.g., shared) via a block chain or other distributed ledger to allow for verification, sharing of bugs/solutions, etc.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example methods, apparatus, systems, and articles of manufacture to dynamically control tracing in a cloud-edge computing environment are disclosed herein. Further examples and combinations thereof include the following:

Example 1 is a distributed edge-based tracing framework system including: an intermediary generator to generate an intermediary in response to a monitoring request, the intermediary to monitor execution of a service executing in an execution vehicle; an intermediary controller to (a) gather data regarding the monitored execution of the service from the intermediary and (b) control the intermediary in response to the monitored execution; and a remediator to provide a remediation in response to an error identified in the monitored execution of the service.

Example 2 includes example 1, wherein the remediator is to provide the remediation including at least one of an adjustment to the service or an adjustment to the execution vehicle of the service.

Example 3 includes example 1, wherein the service includes a plurality of microservices distributed across a plurality of execution vehicles.

Example 4 includes example 1, wherein the execution vehicle includes an endpoint device in communication with an edge service.

Example 5 includes example 1, wherein the execution vehicle includes a container sandbox.

Example 6 includes example 1, wherein the intermediary is associated with an executable primitive.

Example 7 includes example 1, wherein the intermediary includes a tracing intermediary to trace the execution of the service at a point in the execution and a verification intermediary to verify that a measured value satisfies an expected value at the point in the execution.

Example 8 includes example 1, wherein the intermediary is to facilitate stepping through execution of the service to identify a tracer point associated with the intermediary, to generate a notification when the tracer point is reached during the execution of the service, and to trigger handling of a failure identified at the tracer point.

Example 9 includes example 1, further including a trace analyzer to process trace information and associated metadata received from the intermediary.

Example 10 includes example 1, further including a security policy engine to provide attestation for the intermediary.

Example 11 is at least one non-transitory computer readable storage medium comprising instructions that, when executed, cause at least one processor to at least: create an intermediary in response to a monitoring request, the intermediary to monitor execution of a service executing in an execution vehicle; monitor the execution of the service via the intermediary including by gathering data regarding the monitored execution from the intermediary and controlling the intermediary in response to the monitored execution; and providing a remediation in response to an error identified in the monitored execution of the service.

Example 12 includes example 11, wherein the instructions, when executed, cause the at least one processor to provide a remediation including at least one of an adjustment to the service or an adjustment to the execution vehicle of the service.

Example 13 includes example 11, wherein the execution vehicle includes an endpoint device in communication with an edge service, wherein the service includes a plurality of microservices distributed across a plurality of execution vehicles, and wherein the instructions, when executed, cause the at least one processor to the monitor the execution of the service across the plurality of execution vehicles.

Example 14 includes example 11, wherein the instructions, when executed, cause the at least one processor to create a tracing intermediary to trace the execution of the service at a point in the execution and to create a verification intermediary to verify that a measured value satisfies an expected value at the point in the execution.

Example 15 includes example 11, wherein the instructions, when executed, cause the at least one processor to: step through execution of the service via the intermediary to identify a tracer point associated with the intermediary; generate a notification when the tracer point is reached during the execution of the service; and trigger handling of a failure identified at the tracer point.

Example 16 includes example 11, wherein the instructions, when executed, cause the at least one processor to process trace information and associated metadata received from the intermediary.

Example 17 includes example 11, wherein the instructions, when executed, cause the at least one processor to provide attestation for the intermediary.

Example 18 is a method of dynamic tracing control in an edge computing environment. The example method includes: creating, by executing an instruction with at least one processor, an intermediary in response to a monitoring request, the intermediary to monitor execution of a service executing in an execution vehicle; monitoring, by executing an instruction with the at least one processor, the execution of the service via the intermediary including by gathering data regarding the monitored execution from the intermediary and controlling the intermediary in response to the monitored execution; and providing, by executing an instruction with the at least one processor, a remediation in response to an error identified in the monitored execution of the service.

Example 19 includes example 18, wherein the execution vehicle includes an endpoint device in communication with an edge service, wherein the service includes a plurality of microservices distributed across a plurality of execution vehicles, and wherein the method further including monitoring the execution of the service across the plurality of execution vehicles.

Example 20 includes example 18, wherein creating the intermediary includes: creating a tracing intermediary to trace the execution of the service at a point in the execution; and creating a verification intermediary to verify that a measured value satisfies an expected value at the point in the execution.

Example 21 includes example 18, further including: stepping through execution of the service via the intermediary to identify a tracer point associated with the intermediary; generating a notification when the tracer point is reached during the execution of the service; and triggering handling of a failure identified at the tracer point.

Example 22 is a resource provisioning apparatus comprising: memory circuitry to include instructions; and at least one processor to execute the instructions to at least: create an intermediary in response to a monitoring request, the intermediary to be deployed to monitor execution of a service executing in an execution vehicle; monitor the execution of the service via the intermediary including by gathering data regarding the monitored execution from the intermediary and controlling the intermediary in response to the monitored execution; and provide a remediation in response to an error identified in the monitored execution of the service.

Example 23 is an apparatus comprising: means for generating an intermediary in response to a monitoring request, the intermediary to monitor execution of a service executing in an execution vehicle; means for monitoring the execution of the service via the intermediary, the means for monitoring to gather data regarding the monitored execution from the intermediary and to control the intermediary in response to the monitored execution; and means for remediating to provide a remediation in response to an error identified in the monitored execution of the service.

Example 24 includes any of examples 1-10, wherein the intermediary is to be deployed in response to a monitoring request.

Example 25 includes example 24, wherein the intermediary is to be deployed to an execution vehicle in response to a monitoring request.

Example 26 includes any of examples 11-17, wherein the intermediary is to be deployed in response to a monitoring request.

Example 27 includes example 26, wherein the intermediary is to be deployed to an execution vehicle in response to a monitoring request.

Example 28 includes any of examples 18-21, wherein the intermediary is to be deployed in response to a monitoring request.

Example 29 includes example 28, wherein the intermediary is to be deployed to an execution vehicle in response to a monitoring request.

Example 30 is a computer-readable medium comprising instructions to perform any of Examples 18-21.

Example 31 is an edge computing gateway, comprising processing circuitry to perform any of Examples 18-21.

In Example 32, the subject matter of any of Examples 1-31 optionally includes a satellite-based connection to the Internet.

In Example 33, the subject matter of any of Examples 1-32 optionally includes at least one of a service level agreement or a service level objective to provide a context for service execution.

Example 34 includes any of examples 1-33 and further includes a distributed ledger to track service execution.

Example 35 is a system including: means for creating an intermediary in response to a monitoring request, the intermediary to monitor execution of a service executing in an execution vehicle; means for monitoring the execution of the service via the intermediary including by gathering data regarding the monitored execution from the intermediary and controlling the intermediary in response to the monitored execution; and means for providing a remediation in response to an error identified in the monitored execution of the service.

Example 36 includes example 35, wherein the execution vehicle includes an endpoint device in communication with an edge service, wherein the service includes a plurality of microservices distributed across a plurality of execution vehicles, and wherein the method further including monitoring the execution of the service across the plurality of execution vehicles.

Example 37 includes any of examples 35-36, wherein the means for creating the intermediary creates by: creating a tracing intermediary to trace the execution of the service at a point in the execution; and creating a verification intermediary to verify that a measured value satisfies an expected value at the point in the execution.

Example 38 includes any of examples 35-37, further including: means for stepping through execution of the service via the intermediary to identify a tracer point associated with the intermediary; means for generating a notification when the tracer point is reached during the execution of the service; and means for triggering handling of a failure identified at the tracer point.

The following claims are hereby incorporated into this Detailed Description by this reference, with each claim standing on its own as a separate embodiment of the present disclosure.

What is claimed is:

1. A distributed edge-based tracing framework system comprising:
    at least one memory circuit including instructions; and
    at least one processor circuit to execute the instructions to:
        generate a software intermediary for a service in response to a monitoring request, the software intermediary to monitor execution of the service executing in an execution vehicle;
        gather data regarding the monitored execution of the service from the software intermediary;
        adjust control of the software intermediary in response to the monitored execution; and
        provide a remediation in response to an error identified in the monitored execution of the service.

2. The system of claim 1, wherein one or more of the at least one processor circuit is to provide the remediation by at least one of an adjustment to the service or an adjustment to the execution vehicle of the service.

3. The system of claim 1, wherein the service includes a plurality of microservices distributed across a plurality of execution vehicles.

4. The system of claim 1, wherein the execution vehicle includes an endpoint device in communication with an edge service.

5. The system of claim 1, wherein the execution vehicle includes a container sandbox.

6. The system of claim 1, wherein the software intermediary is associated with an executable primitive.

7. The system of claim 1, wherein the software intermediary is to trace the execution of the service at a point in the execution and is to verify that a measured value satisfies an expected value at the point in the execution.

8. The system of claim 1, wherein the software intermediary is to facilitate stepping through execution of the service to identify a tracer point associated with the software intermediary, to generate a notification when the tracer point is reached during the execution of the service, and to trigger handling of a failure identified at the tracer point.

9. The system of claim 1, wherein one or more of the at least one processor is to process trace information and associated metadata received from the software intermediary.

10. The system of claim 1, wherein one or more of the at least one processor is to provide attestation for the software intermediary.

11. At least one non-transitory computer readable storage medium comprising instructions to cause at least one processor circuit to at least:
create a software intermediary for a service in response to a monitoring request, the software intermediary to monitor execution of the service executing in an execution vehicle;
monitor the execution of the service via the software intermediary by gathering data regarding the monitored execution from the software intermediary and adjusting control of the software intermediary in response to the monitored execution; and
provide a remediation in response to an error identified in the monitored execution of the service.

12. The at least one non-transitory computer readable storage medium of claim 11, wherein the instructions, when executed, cause one or more of the at least one processor circuit to at least one of adjust to the service or adjust the execution vehicle of the service.

13. The at least one non-transitory computer readable storage medium of claim 11, wherein the execution vehicle includes an endpoint device in communication with an edge service, wherein the service includes a plurality of microservices distributed across a plurality of execution vehicles, and wherein the instructions, when executed, cause one or more of the at least one processor circuit to the monitor the execution of the service across the plurality of execution vehicles.

14. The at least one non-transitory computer readable storage medium of claim 11, wherein the instructions, when executed, cause one or more of the at least one processor circuit to create a tracing intermediary to trace the execution of the service at a point in the execution and to create a verification intermediary to verify that a measured value satisfies an expected value at the point in the execution.

15. The at least one non-transitory computer readable storage medium of claim 11, wherein the instructions, when executed, cause one or more of the at least one processor circuit to:
step through execution of the service via the software intermediary to identify a tracer point associated with the software intermediary;
generate a notification when the tracer point is reached during the execution of the service; and
trigger handling of a failure identified at the tracer point.

16. The at least one non-transitory computer readable storage medium of claim 11, wherein the instructions, when executed, cause one or more of the at least one processor circuit to process trace information and associated metadata received from the software intermediary.

17. The at least one non-transitory computer readable storage medium of claim 11, wherein the instructions, when executed, cause one or more of the at least one processor circuit to provide attestation for the software intermediary.

18. A method of dynamic tracing control in an edge computing environment, the method comprising:
creating, by executing an instruction with at least one processor circuit, a software intermediary in response to a monitoring request, the software intermediary to monitor execution of a service executing in an execution vehicle;
monitoring, by executing an instruction with one or more of the at least one processor circuit, the execution of the service via the software intermediary by gathering data regarding the monitored execution from the software intermediary and controlling the software intermediary in response to the monitored execution; and
providing, by executing an instruction with one or more of the at least one processor circuit, a remediation in response to an error identified in the monitored execution of the service.

19. The method of claim 18, wherein the execution vehicle includes an endpoint device in communication with an edge service, wherein the service includes a plurality of microservices distributed across a plurality of execution vehicles, and wherein the method further includes monitoring the execution of the service across the plurality of execution vehicles.

20. The method of claim 18, wherein creating the software intermediary includes:
creating a tracing intermediary to trace the execution of the service at a point in the execution; and
creating a verification intermediary to verify that a measured value satisfies an expected value at the point in the execution.

21. The method of claim 18, further including:
stepping through execution of the service via the software intermediary to identify a tracer point associated with the intermediary;
generating a notification when the tracer point is reached during the execution of the service; and
triggering handling of a failure identified at the tracer point.

* * * * *